(12) United States Patent
Hu et al.

(10) Patent No.: US 10,356,798 B2
(45) Date of Patent: *Jul. 16, 2019

(54) FRAME STRUCTURE, A DEVICE FOR RECEIVING A COMMUNICATION SIGNAL, A DEVICE FOR SENDING A COMMUNICATION SIGNAL, AND A METHOD FOR RECEIVING OR SENDING A COMMUNICATION SIGNAL

(71) Applicant: Huawei Technologies Co., Ltd., Shenzhen (CN)

(72) Inventors: Liang Hu, Shenzhen (CN); Markus Martin Dillinger, Munich (DE); Abdelmajid Khelil, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

This patent is subject to a terminal disclaimer.

(21) Appl. No.: 15/597,974

(22) Filed: May 17, 2017

(65) Prior Publication Data

US 2017/0251486 A1 Aug. 31, 2017

Related U.S. Application Data

(63) Continuation of application No. PCT/EP2014/074742, filed on Nov. 17, 2014.

(51) Int. Cl.
*H04W 72/10* (2009.01)
*H04W 72/12* (2009.01)
(Continued)

(52) U.S. Cl.
CPC ......... *H04W 72/10* (2013.01); *H04W 56/001* (2013.01); *H04W 72/0406* (2013.01);
(Continued)

(58) Field of Classification Search
CPC ..... H04W 76/14; H04W 72/02; H04W 72/10; H04W 92/18; H04W 72/04;
(Continued)

(56) References Cited

U.S. PATENT DOCUMENTS 8,320,244 B2 11/2012 Muqattash et al.
2011/0064405 A1 3/2011 Rajagopal et al.
(Continued)

FOREIGN PATENT DOCUMENTS

EP 2188957 B1 5/2012
EP 2019506 B1 2/2014

OTHER PUBLICATIONS

ETRI, "Channel Design and Scheduling for Out-of-Coverage D2D Communications", 3GPP TSG-RAN1 Meeting #74bis R1-134334, Agenda Item 7.2.8.1.2, Guangzhou, China, Oct. 7-11, 2013, 4 pages.

(Continued)

Primary Examiner — Will W Lin
(74) Attorney, Agent, or Firm — Slater Matsil, LLP

(57) ABSTRACT

A frame structure for network communication, in particular for device-to-device network communication, with high and low priority data. The frame structure includes a control channel related to a first communication resource, a high priority data channel related to a second communication resource, and a low priority data channel related to a third communication resource. The control channel includes a high priority data channel control portion configured to communicate control data that is related to the high priority data channel, and a low priority data channel control portion configured to communicate control data that is related to the low priority data channel.

20 Claims, 18 Drawing Sheets

(51) Int. Cl.
*H04W 56/00* (2009.01)
*H04W 72/04* (2009.01)
*H04W 72/08* (2009.01)
*H04W 84/18* (2009.01)
*H04W 92/18* (2009.01)

(52) U.S. Cl.
CPC ..... *H04W 72/085* (2013.01); *H04W 72/1242* (2013.01); *H04W 84/18* (2013.01); *H04W 92/18* (2013.01)

(58) Field of Classification Search
CPC ........... H04W 72/0406; H04W 56/001; H04W 72/085; H04W 72/1242; H04W 84/18; H04L 5/0053
See application file for complete search history.

(56) References Cited

U.S. PATENT DOCUMENTS

| | | | |
|---|---|---|---|
| 2011/0261793 | A1 | 10/2011 | Cavalcanti et al. |
| 2011/0305208 | A1* | 12/2011 | Wu .................. H04W 72/1247 370/329 |
| 2012/0182962 | A1* | 7/2012 | Patil .................. H04W 72/1205 370/330 |
| 2012/0307762 | A1 | 12/2012 | Reumerman et al. |
| 2015/0077270 | A1* | 3/2015 | Rubin ...................... G08G 9/02 340/903 |
| 2017/0142741 | A1* | 5/2017 | Kaur .................. H04W 56/002 |
| 2017/0245295 | A1* | 8/2017 | Jung .................... H04W 28/02 |
| 2018/0077734 | A1* | 3/2018 | Kim ......................... H04L 1/18 |

OTHER PUBLICATIONS

Gabor Fodor et al., "Design Aspects of Network Assisted Device-to-Device Commuications", IEEE Communications Magazine, Mar. 2012, pp. 170-177.

Ki Jun Jeon et al., "Distributed Interference Channel Based Resource Allocation for Network-Assisted Device-to-Device Communications", Proceedings of IWSDA '13, IEEE, Oct. 27, 2013, pp. 96-98.

Samsung, "Procedures for D2D Frame Number Alignment", 3GPP TSG RAN WG1 Meeting #78 R1-143101, Agenda Item 7.2.3.3.3, Dresden, Germany, Aug. 18-22, 2014, 7 pages.

* cited by examiner

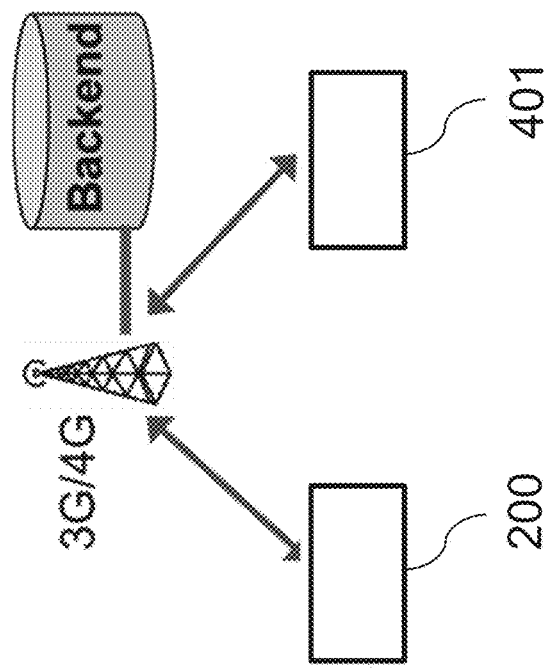
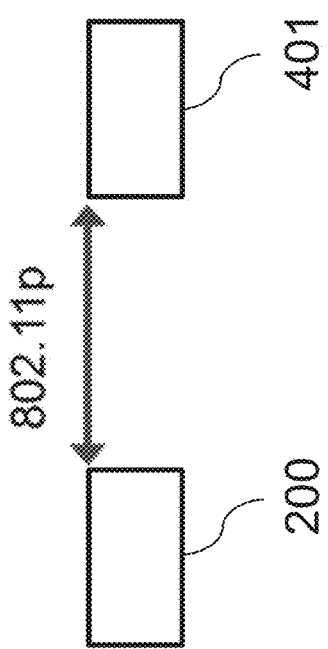
Fig. 18

FRAME STRUCTURE, A DEVICE FOR RECEIVING A COMMUNICATION SIGNAL, A DEVICE FOR SENDING A COMMUNICATION SIGNAL, AND A METHOD FOR RECEIVING OR SENDING A COMMUNICATION SIGNAL

CROSS-REFERENCE TO RELATED APPLICATIONS

This application is a continuation of International Application No. PCT/EP2014/074742, filed on Nov. 17, 2014, the disclosure of which is hereby incorporated by reference in its entirety.

TECHNICAL FIELD

Embodiments of the present invention relate to the technical field of medium access control (MAC) in communication networks.

BACKGROUND

In communication networks, communication resources used for communication, such as time slots or frequency channels, are usually shared by a number of devices. In order to coordinate an access of the number of devices on the communication resources, medium access control (MAC) mechanisms can be applied. Common mechanisms for MAC are e.g. carrier sense multiple access with collision avoidance (CSMA/CA) or carrier sense multiple access with collision detection (CSMA/CD). Data to be communicated can be embedded in a frame structure adapted to the employed MAC mechanism.

In CSMA/CA, a carrier sensing scheme is used, where the number of devices can attempt to avoid collisions by transmitting only when the communication resource is sensed to be idle. In CSMA/CD, a carrier sensing scheme is used, where a device can detect collisions while transmitting data, can stop transmitting the data, and can wait for a time interval before resending the data.

Newly emerging applications, e.g. vehicle-to-X (V2X) communications and device-to-device (D2D) communications, can pose challenges with regard to providing a low latency, a high reliability, a high data rate, and an extensive connectivity within the communication networks. Moreover, data having different priorities may be communicated within the communication networks. Common MAC mechanisms in conjunction with common frame structures, however, are usually not capable of providing these functionalities concurrently and can suffer from a lack of flexibility and scalability.

In G. Fodor et al., "Design Aspects of Network Assisted Device-to-Device Communications," IEEE Communications Magazine, May 2011, a device-to-device communication network is described.

SUMMARY

It is an object of the embodiments to provide an improved effectiveness and efficiency of a communication network.

This object is achieved by the features of the independent claims. Further implementation forms are apparent from the dependent claims, the description and the figures.

The embodiments are based on the finding that an efficient unified frame structure can be employed for communicating high priority data and low priority data within the communication network. The frame structure can be structured in dependence of a mode from a set of modes, where the set of modes can include an ad-hoc mode and a network-assisted mode. For medium access control (MAC) of communication devices, a protocol including at least two phases can be employed, where, during a first phase of the protocol, a communication device is configured to only receive data, in particular the high priority data and the low priority data, and where, during a second phase of the protocol, the communication device is configured to receive data, in particular the high priority data and the low priority data, or to send data, in particular high priority data or low priority data. Therefore, an improved effectiveness and efficiency of a communication network, used e.g. for vehicle-to-X (V2X) communications or device-to-device (D2D) communications, can be achieved.

According to a first aspect, the embodiments relate to a frame structure for network communication. This network communication can be a device-to-device network communication. The network communication includes high priority data and low priority data. The frame structure includes a control channel that is related to a first communication resource. The frame structure includes a high priority data channel that is related to a second communication resource. And the frame structure includes a low priority data channel that is related to a third communication resource. The communication resources can be used and/or shared by multiple users, in particular members of a device-to-device network. The control channel includes a high priority data channel control portion configured to communicate control data that is related to the high priority data channel. Additionally or alternatively, the control channel includes a low priority data channel control portion configured to communicate control data that is related to the low priority data channel. The frame structure is configured to communicate high priority data within the high priority data channel over the second communication resource. And the frame structure is configured to communicate the low priority data within the low priority data channel over the third communication resource.

The difference between the high priority data channel control portion and the low priority data channel control portion can be defined by the content of the communicated data itself, i.e. data related to the high priority data channel defines the high priority data channel control portion and/or data related to the high priority data channel defines the high priority data channel control portion. Furthermore a difference between the high priority data channel control portion and the low priority data channel control portion can also be defined by a resource criteria, in particular a time-based, a frequency-based or a code-sequence-based criteria.

The high priority data can include safety related data. The low priority data can include non-safety related data. The high priority data channel control portion can be associated with the high priority data. The low priority data channel control portion can be associated with the low priority data.

The control channel of the frame structure can communicate a synchronization signal, in particular a primary synchronization sequence (PSS)/secondary synchronization sequence (SSS)-similar sequence, information on the synchronization source and/or an accuracy of this information.

Furthermore, the control channel can communicate identification information, in particular a device identification and/or a reserved resource identifier (ID) that can refer to a time domain resource, a frequency domain resource or a code sequence. Additionally or alternatively the control channel can communicate a time-based information, in particular a reservation duration for a predetermined resource, or a resource hopping pattern.

Furthermore, the control channel can communicate device context information, in particular device position, one hop neighbor information. The high priority data channel control portion can include a high priority data channel control portion message being associated with the high priority data or being linked to the high priority data such as explained above. The low priority data channel control portion can include a low priority data channel control portion message being associated with the low priority data or being linked to the low priority data.

The frame structure can be a unified MAC frame structure, which can be applicable in an ad-hoc mode or a network-assisted mode. The frame structure can enable an effective control of the high priority data channel and the low priority data channel, and can effectively address the high priority data channel and the low priority data channel.

In a first implementation form of the frame structure according to the first aspect as such, the frame structure is structured in dependence of a mode from a set of modes, where the set of modes includes an ad-hoc mode and a network-assisted mode. Thus, a capability to operate in different modes, in particular in different networks, and an increased robustness can be provided.

Thereby, an ad-hoc mode refers to a mode where an ad-hoc communication to other participants is performed or established. Ad-hoc communication is performed within an ad-hoc network, which refers to a self-configuring network without the infrastructure of a hierarchically organized network, such as a long term evolution (LTE) network. The assisted-mode refers to a communication over a hierarchically organized network, such as an LTE-network. A hierarchically organized network can include a central network controller. In a hierarchically organized network uplink and downlink communication with a hierarchically superior level is performed, in particular to a central network controller.

In a second implementation form of the frame structure according to the first implementation form of the first aspect, the frame structure (100) is configured to communicate data directly between at two or more devices. A device can be moving devices, in particular cars, and/or static devices, that can be in particular attached to toll stations, bridges, houses, etc. Furthermore, in the ad-hoc mode, the control channel of the frame structure, in particular the high priority data channel control portion and/or the low priority data channel control portion is configured to communicate a neighboring device indicator, in particular a list indicating neighboring devices. This can be performed by a coordination data portion of the control channel. Thus, a distributed coordination of neighboring devices can be performed efficiently.

The neighboring device indicator or other information that can be communicated over the frame structure can include data on synchronization, e.g. a synchronization sequence or signal; a device ID, a reservation resource data, a context data, e.g. position data, velocity data, a guard interval. Additionally or alternatively the data can include data related to cancel interference due to Doppler shifting of cars that move relative to each other.

The neighboring device indicator can include data for the distributed coordination of the neighboring devices, e.g. obtained by receiving data of the neighboring devices. The neighboring devices can be further communication devices.

In a third implementation form of the frame structure according to the first implementation form or the second implementation form of the first aspect, in the network-assisted mode, the control channel of the frame structure, in particular the high priority data channel control portion and/or the low priority data channel control portion, is configured to include data received from a cellular network controller. Additionally or alternatively, the high priority data channel or the low priority data channel is configured to communicate data directly between at least two devices. A device can be moving devices, in particular cars, and/or static devices, that can be in particular attached to toll stations, bridges, houses, etc.

A cellular network controller can be part of a hierarchically superior level of the communication network on which the network-assisted mode is based. The communication can include downlink information. This can come from a hierarchically superior node, in particular a central network controller. The communication can include uplink information. This can be broadcasted to all nodes in the network, to a set of nodes or only to a predefined node. The downlink information can be configured to communicate data related to the second communication resource or the third communication resource. Thus, a support of a communication network coordinated control, e.g. a coordinated communication resource allocation, can be provided efficiently.

In the network-assisted mode the control channel can include a downlink portion used for downlink communications. The control channel, in particular the high priority data channel control portion and/or the low priority data channel control portion, can further include an uplink portion for uplink communications. In particular, downlink information can be used in the network-assisted mode.

In a fourth implementation form of the frame structure according to the first aspect as such or any preceding implementation form of the first aspect, the control channel, in particular the high priority data channel control portion and/or the low priority data channel control portion, the high priority data channel, and/or the low priority data channel is configured to communicate a synchronization sequence. Thus, synchronous communications can be performed efficiently. Furthermore, an efficient time synchronization and/or frequency synchronization can be achieved.

The synchronization sequence can be a synchronization sequence similar to a primary synchronization sequence (PSS) or similar to a secondary synchronization sequence (SSS) in LTE.

In a fifth implementation form of the frame structure according to the first aspect as such or any preceding implementation form of the first aspect, the frame structure has a predetermined dimension, or where the control channel, in particular the high priority data channel control portion and/or the low priority data channel control portion, is allocated permanently. The dimension can include a time dimension a frequency dimension, and/or a code-based dimension. The dimension can in particular include a time dimension and a frequency dimension, as is typical e.g. for $4^{th}$ generation cellular communication systems. Thus, synchronous communications can be performed efficiently.

The predetermined length can be fixed, e.g. 10 ms. The length of the control channel, the length of the high priority data channel portion, and/or the length of the low priority data channel can also be reconfigurable.

In a sixth implementation form of the frame structure according to the first aspect as such or any preceding implementation form of the first aspect, low priority data is arranged within the high priority data channel of the frame structure. Thus, an improved use of communication resources can be achieved.

The low priority data can be arranged within the high priority data channel of the frame structure e.g. if the high priority data channel is not completely used.

Additionally or alternatively, high priority data can be sent over the low priority data channel. In particular, if high priority data exceeds the capacity of the high priority data channel.

In a seventh implementation form of the frame structure according to the first aspect as such or any preceding implementation form of the first aspect, the control channel, in particular the high priority data channel control portion and/or the low priority data channel control portion, includes a communication device identification associated with the high priority data and/or the low priority data. Thus, a paging of the communication device can be achieved efficiently. The communication device identification can include a sequence of numbers and/or characters.

In an eighth implementation form of the frame structure according to the first aspect as such or any preceding implementation form of the first aspect, first communication resource, the second communication resource, or the third communication resource respectively includes a time domain resource, a frequency domain resource, and/or a coding sequence resource. Thus, an efficient mapping of physical communication resources can be achieved. Furthermore, no preconfigured length of the resources may be used, and in particular a communication resource reservation on demand may be enabled.

In a ninth implementation form of the frame structure according to the first aspect as such or any preceding implementation form of the first aspect, the first communication resource and/or the second communication resource can be multiplexed in time domain, frequency domain, and/or code domain. The multiplexing can be performed according to a frequency division multiple access (FDMA) scheme, a time division multiple access (TDMA) scheme, a code division multiple access (CDMA) scheme, and/or a combination thereof. The multiplexing can further be performed according to a frequency or time based hopping scheme. The multiplexing can be a stochastic multiplexing. The multiplexing can be based on the control information. In particular, as the first communication resource of the control channel carries the most important information it is not multiplexed with the other resources.

According to a second aspect, the embodiments relates to a communication device for receiving a communication signal, in particular a device-to-device network communication signal, with high and low priority data, where the communication device is configured to recognize a frame structure according to the first aspect as such or any implementation form of the first aspect of the embodiments.

The communication device for receiving a communication signal can include a communication interface being configured to receive the communication signal, to extract the frame structure from the communication signal, to extract the control channel from the frame structure, and to extract the high priority data channel control portion and/or the low priority data channel control portion from the control channel. Furthermore the device can include a processor being configured to extract control data from the control channel upon the basis of the first communication resource, to extract the high priority data from the high priority data channel upon the basis of the second communication resource and to extract the low priority data from the low priority data channel upon the basis of the third communication resource. Thus, an improved effectiveness and efficiency of a communication network can be realized.

The communication device can be arranged within a vehicle or car, or can be carried by a pedestrian. The communication device can further be arranged within traffic infrastructure.

According to a third aspect, the embodiments relate to a communication device for sending a communication signal, in particular a device-to-device network communication signal, with high and low priority data, where the communication signal includes a frame structure according to the first aspect as such or any implementation form of the first aspect of the embodiments.

In a first implementation form of the third aspect of the embodiments, the communication device for sending a communication signal is configured to perform at least one of the operations: to configure the frame structure (100) for the communication signal; to configure the control channel (101) for the frame structure (010), in particular to configure or generate the control data sent over the control channel; to configure the high priority data channel control portion (107) or the low priority data channel control portion (109) for the control channel; to configure the high priority or the low priority data channel for the communication signal; to communicate the control data over the first communication resource; to communicate the high priority data over the second communication resource, and to communicate the low priority data over the third communication resource.

The device can be configured such that a choice of which operation to perform can be received from the environment, in particular over a data network.

In a second implementation form of the third aspect of the embodiments according to the third aspect as such or according to the first implementation form of the third, at least one channel, in particular the control channel, the high priority data channel, and the low priority data channel, the frame structure includes at least one sub-frame and where the device is configured to sense for a period of a share, in particular a random share, of the length of the subframe before sending data over at least one of the group of the control channel, the high priority data channel and the low priority data channel.

The time by which the sending delayed is called delay time. During the delay time the device can be configured to check if a desired resource is occupied. If it is observed that the resource is free the communication can go on using the desired resource. If it is observed that the desired resource is occupied another resource for the communication is searched. The search can be terminated if a free resource is found. Additionally or alternatively the search can be terminated according to a predefined termination time. If during the predetermined determination time no free resource is found the communication can be performed over an already occupied resource. This occupied resource can be selected according to a criterion. A criterion can be based on a distance, e.g. a positional distance, in particular an occupied resource can be selected that belongs to another device which has a maximal distance to the device at hand. Thus, it can be prevented that communication of different devices collides at a certain resource. Furthermore, it can be prevented that in the case when a collision cannot be avoided, the hazards caused by the collision can at least be minimized.

The approach can be applied when receiving a communication signal including information of a neighboring device. Before transmitting, a listening within a random time period can be performed to determine whether a neighboring device reserves the same specific communication resource. A carrier sense multiple access (CSMA) scheme can be applied. A collision, in particular in the control channel or another channel, may be detected.

For a better coordination of the communication a device can seek to stick to an already reserved resource, in particular the control channel, the high priority channel and/or the low priority channel. Thus, other devices can more easily find free resources.

In a third implementation form of the third aspect of the embodiments according to the third aspect as such or according to the first implementation form, the communication device is configured to determine if a surrounding cellular-network provides a priority to the communication signal. Additionally, the device can be configured to use an LTE-network resource, for sending the communication signal, if the priority is provided, in particular the LTE-legacy signal. In particular, the device can be configured to use a physical uplink shared channel (PUSCH) channel of an LTE-network. Additionally, the remaining part of the PUSCH-channel can be used for LTE communication. Furthermore, the device is configured to receive configuration information, i.e. detailed resource information, in particular which resource of an LTE-network should be used to communicate with the frame structure according to the first aspect of the embodiments. In similar implementation form priority to the communication signal is always provided. Additionally, the LTE-legacy signal can only use resources not occupied by the communication signal.

In a fourth implementation form according to the third aspect as such or according to the first implementation form, the communication device is configured to communicate a predetermined data over at least two resources within at least one of the group of the control channel, the high priority data channel, and the low priority data channel. In particular a safety related data can be communicated over the high priority data channel at a first part of the second communication resource and at a second part of the second communication resource. As the resource, a part of the resource has a predetermined dimension including at least one of the group of a time-based resource, a frequency-based resource, and a coding-sequence-based resource.

In a fifth implementation form according to the second aspect and/or to the third aspect of the embodiments the communication device is configured to receive a mode indicator signal or to determine a signal strength of the communication signal, and where the communication device, in particular a processor, is configured to determine the mode of the frame structure based on the mode indicator signal or the signal strength of the communication signal. Thus, a switching between ad-hoc mode and network-assisted mode based on coverage of the communication network can be achieved, and/or a decision criterion for an automatic mode switching can be provided. In particular, the device can decide which mode to be selected, ad-hoc mode or network-assisted mode, based on an assessment of a reference signal received power (RSRP) of a cellular network.

Additionally or alternatively, the mode indicator signal can include a communication quality indicator signal. The mode indicator signal can be generated and transmitted by a hierarchically superior communication network controller of the communication network. The communication signal can be received in the ad-hoc mode or the network-assisted mode of the frame structure.

In a sixth implementation form according to the second aspect and/or to the third aspect of the embodiments the communication device is configured such that the control channel, in particular the high priority data channel control portion and/or the low priority data channel control portion, includes a communication device identification associated with the high priority data and/or the low priority data, where the processor is configured to compare the communication device identification associated with the high priority data and/or the low priority data with a communication device identification associated with the communication device, and to extract the high priority data and the low priority data if the communication device identification associated with the high priority data and/or the low priority data corresponds to the communication device identification associated with the communication device. Thus, an efficient paging of the communication device can be achieved.

In a seventh implementation form of the communication device according to the second aspect or according to the second and/or third aspect of the embodiments the communication device is configured to operate according to a protocol including at least two phases, where, during a first phase of the protocol, the communication device is configured to only receive data, in particular data communicated in the control channel, the high priority data and/or the low priority data. Thus, an identification of neighboring devices in a dynamically changing environment by firstly listening to which devices are present can be achieved. Additionally or alternatively, during a second phase of the protocol, the communication device is configured to receive data, in particular data communicated in the control channel, the high priority data and the low priority data, or to send data, in particular data carried in the control channel, high priority data and/or low priority data.

The protocol can be based on the frame structure. The length of the first phase can be limited, in particular to minimize the latency of starting transmitting data. The first phase can be referred to as monitor phase. The second phase can include an initial access phase and/or an established phase.

In an eight implementation form of the communication device according to the seventh implementation form, during the second phase of the protocol, the communication device is configured to receive and/or send data associated with neighboring devices, in particular payload data, data on device identity, synchronization sequence data, resource reservation ID data, and/or communication device identifications of the neighboring devices. Thus, an orientation and communication resource reservation in a dynamically changing environment can be achieved.

The data, in particular high priority data, can be transmitted more than one time, in particular in one frame. Redundancy can yield an improved reliability and/or safety of communications within the communication network.

In a ninth implementation form of the communication device according to the second and/or the third aspect of the embodiments, the communication signal is a vehicle-to-X (V2X) communication signal or a device-to-device (D2D) communication signal. Thus, the approach can be applied to a vehicle-to-X (V2X) communication networks or to a device-to-device (D2D) communication networks.

The vehicle-to-X (V2X) communication network or the device-to-device (D2D) communication network can be an Institute for Electrical and Electronics Engineers (IEEE) 802.11p based communication network or a long term evolution (LTE) based communication network.

According to a fourth aspect, the embodiments relates to a method for receiving and/or for sending a communication signal, in particular a device-to-device communication signal, with high and low priority data configured to operate a device according to the second and/or the third aspect of the embodiments.

The method includes at least one of the steps: receiving the communication signal; extracting the frame structure from the communication signal; extracting the control channel from the frame structure; extracting the high priority data channel control portion or the low priority data channel control portion from the control channel; extracting the control data from the control channel upon the basis of the first communication resource; extracting the high priority data from the high priority data channel upon the basis of the second communication; and extracting the low priority data from the low priority data channel upon the basis of the third communication resource; sending the communication signal; configuring the frame structure for the communication signal; configuring the control channel of the frame structure; configuring the high priority data channel control portion or the low priority data channel control portion of the control channel; communicating control information from the control channel over the first communication resource; communicating the high priority data from the high priority data channel over the second communication resource; and communicating the low priority data for the low priority data channel over the third communication resource.

The method can be performed by the communication device. Further features of the method can directly result from the functionality of the communication device.

According to a fifth aspect, the embodiments relate to a computer program including a program code for performing the method according to the fourth aspect when executed on a computer. Thus, the method can be performed in an automatic and repeatable manner.

The communication device, in particular the processor, can be programmably arranged to perform the computer program.

The embodiments can be implemented in hardware and/or software.

BRIEF DESCRIPTION OF THE DRAWINGS

Embodiments of the invention will be described with respect to the following figures, in which:

FIG. 18 shows a diagram of communication scenarios in an ad-hoc mode and a network-assisted mode according to an embodiment.

DETAILED DESCRIPTION OF ILLUSTRATIVE EMBODIMENTS

Figure 1:
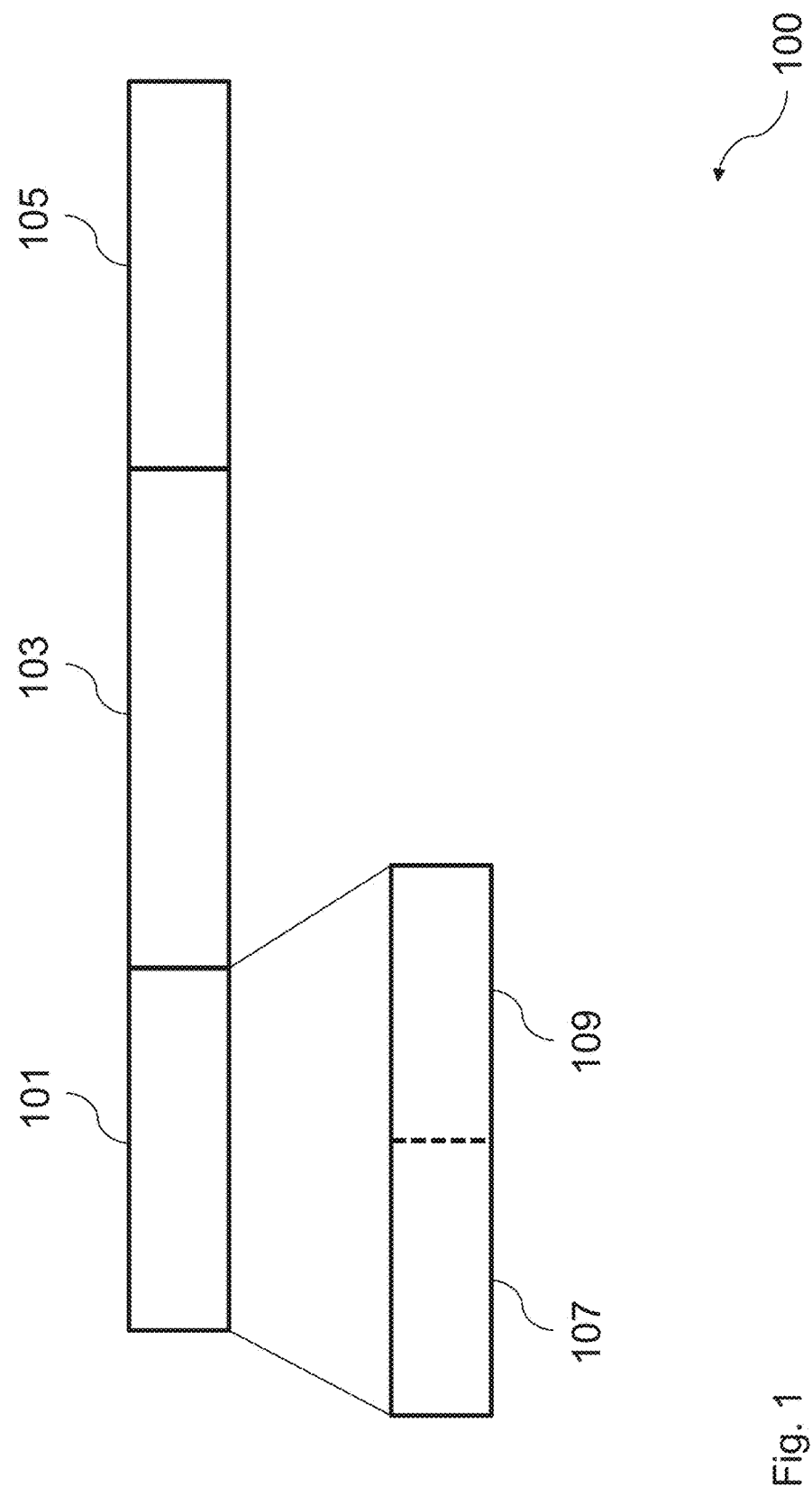
FIG. 1 shows a diagram of a frame structure including high priority data and low priority data according to an embodiment.

FIG. 1 shows a diagram of a frame structure 100 configured to communicate high priority data and low priority data according to an embodiment.

The frame structure 100 includes a control channel 101, a high priority data channel 103, and a low priority data channel 105, where the control channel 101 includes a high priority data channel control portion 107 configured to communicate control data that is related to the high priority data channel, and a low priority data channel control portion configured to communicate control data that is related to low priority data channel, where the frame structure is configured to communicate high priority data within the high priority data channel (103) over the second communication resource, and where the frame structure is configured to communicate the low priority data within the low priority data channel (105) over the third communication resource.

The frame structure 100 can be structured in dependence of a mode from a set of modes, where the set of modes includes an ad-hoc mode and a network-assisted mode. The first communication resource, the second communication resource, and/or the third communication resource, can respectively include a time-domain resource, a frequency-domain resource, and/or a coding-sequence resource.

Figure 2:
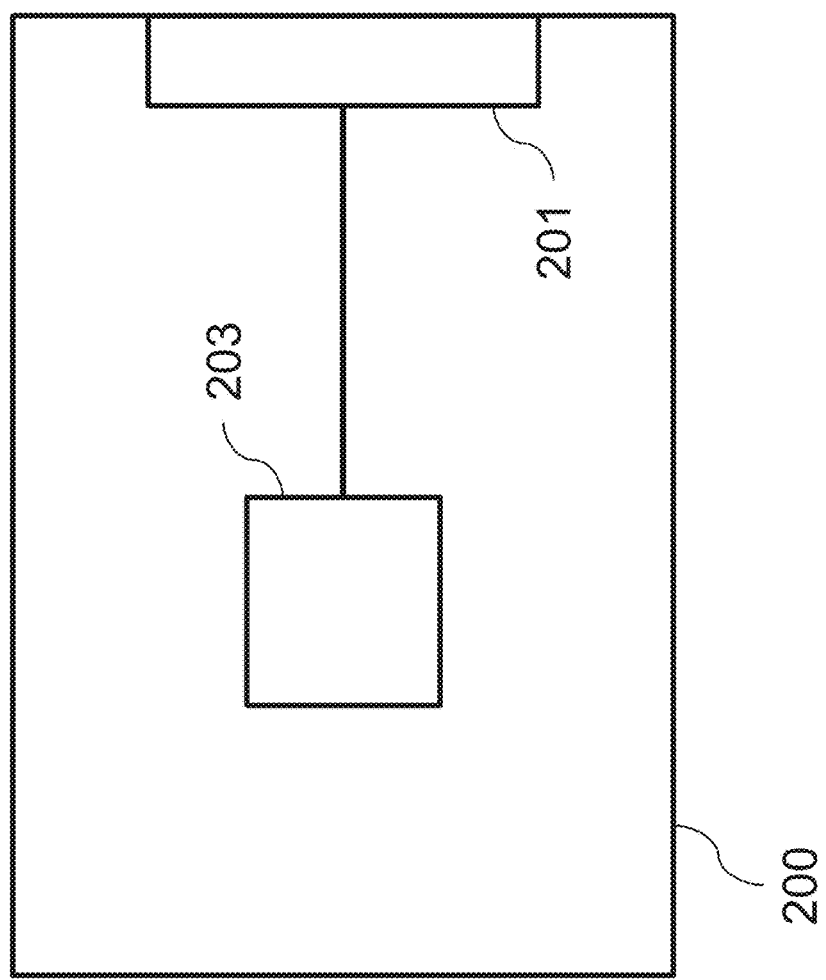
FIG. 2 shows a diagram of a communication device for receiving a communication signal including high priority data and low priority data over a communication network according to an embodiment.

FIG. 2 shows a diagram of a communication device 200 for receiving and/or for sending a communication signal including high priority data and low priority data over a communication network according to an embodiment. The communication signal includes a frame structure 100 as described in conjunction with FIG. 1.

The communication device 200 includes a communication interface 201 being configured to receive and/or to send the communication signal, to extract the frame structure from the communication signal, to extract the control channel from the frame structure, and to extract the high priority data channel control portion and the low priority data channel control portion from the control channel upon the basis of the first communication resource permanently preallocated, and a processor 203 being configured to extract the high priority data from the high priority data channel upon the basis of the second communication resource indicated by the high priority data channel control portion, and to extract the low priority data from the low priority data channel upon the basis of the third communication resource indicated by the low priority data channel control portion.

The communication interface 201 can be configured to receive a mode indicator signal or to determine a signal strength of the communication signal, and the processor 203 can be configured to determine the mode of the frame structure based on the mode indicator signal or the signal strength of the communication signal.

The communication device 200 can be configured to operate according to a protocol including at least two phases, where, during a first phase of the protocol, the communication device 200 can be configured to only receive data, in particular the high priority data and the low priority data, and where, during a second phase of the protocol, the communication device 200 can be configured to receive data, in particular the high priority data and the low priority data, or to transmit data, in particular transmission high priority data and/or transmission low priority data. During the second phase of the protocol, the communication device 200 can be configured to receive data associated with neighboring devices, in particular geographic positions and/or communication device identifications of the neighboring devices, and/or to transmit data about its own identity, in particular a communication device identification.

Figure 3:
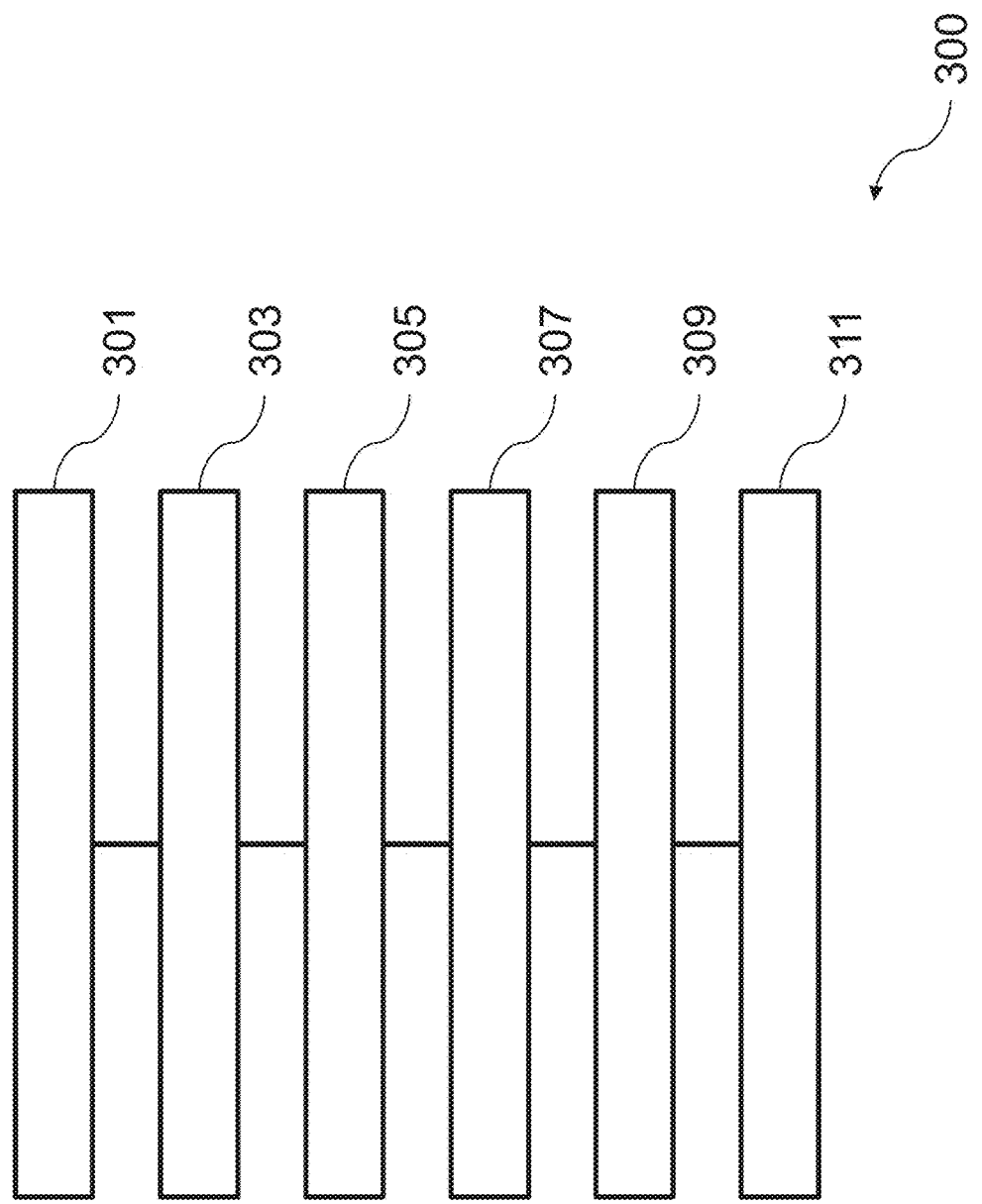
FIG. 3 shows a diagram of a method for receiving a communication signal including high priority data and low priority data over a communication network according to an embodiment.

FIG. 3 shows a diagram of a method 300 for receiving and/or sending a communication signal including high priority data and low priority data over a communication network according to an embodiment. The communication signal includes a frame structure 100 as described in conjunction with FIG. 1.

The method 300 includes receiving and/sending 301 the communication signal, extracting 303 the frame structure from the communication signal, extracting 305 the control channel from the frame structure, extracting 307 the high priority data channel control portion and the low priority data channel control portion from the control channel, extracting 309 the high priority data from the high priority data channel upon the basis of the second communication resource indicated by the high priority data channel control portion, and extracting 311 the low priority data from the low priority data channel upon the basis of the third communication resource indicated by the low priority data channel control portion.

In the following, further embodiments and implementation forms of the frame structure 100, the communication device 200 and the method 300 are described in more detail.

A unified medium access control (MAC) frame structure 100 and a distributed protocol for vehicle-to-X (V2X) services are provided. The communication device 200 and the method 300 can relate to the design of the frame structure 100 and a distributed protocol e.g. for $5^{th}$ generation (5G) wireless communication networks for supporting vehicle-to-X (V2X) communications e.g. in the domain of communication technologies for intelligent transportation systems (ITS).

Enabling wireless connectivity for vehicles and road users can be driven by social and economic benefits expected from intelligent transportation system (ITS) applications, supporting road safety and traffic efficiency through vehicle-to-vehicle (V2V), vehicle-to-infrastructure (V2I) and vehicle-to-device (V2D) communications. A communication device 200 can e.g. be used by road users, e.g. cars, bikes, motors, pedestrians, or pets. The term vehicle-to-X (V2X) communications is used to cover vehicle-to-vehicle (V2V), vehicle-to-infrastructure (V2I) and vehicle-to-X (V2X) communications.

Safety related applications can rely on a short message broadcasting in a vehicle's neighborhood, e.g. vehicles and other road users, in order to reduce fatalities on the road. Traffic efficiency applications may use a support of roadside units (RSUs) having communication capabilities to send periodic updates to remote traffic control centers. These applications can exhibit specific features, e.g. in terms of generation patterns, delivery specifications, communication primitives, and spatial and temporal scope, which can challenge existing wireless networking technologies.

There can be specifications of V2X services in order to enable safety relevant driver assistance. The following specifications may be adhered to: a low end-to-end latency, e.g. less than 50 ms, a reliable data packet delivery, e.g. 99.99% probability, in addition to a low latency, and approximately 100% availability or connectivity with and without mobile cellular communication network coverage.

Furthermore, in order to enable next generation V2X services, e.g. automatic driving, further specifications of V2X services can be to provide high data volumes at a low latency being jitter-free, e.g. for real-time augmented reality safety related services. There can be two types of services that can promote automatic driving: traffic safety related services having hard quality of service (QoS) specifications, and traffic efficiency related services having soft QoS specifications.

Traffic safety related services can include the following examples: Cooperative awareness messages (CAMs), e.g. according to the European telecommunications standards institute (ETSI) standard, can inform other vehicles about a current status of a sending vehicle, e.g. position and/or velocity, and can be periodical e.g. with a frequency of 1-10 Hz. Context-rich mission-critical data (CMD) can be suited for real-time augmented reality applications, can use a large data size, e.g. 10-100 MByte, and can be event-driven and/or periodical. Traffic efficiency related services can include the following example: Floating car data (FCD) which can optimize flows of vehicles in order to reduce travel time and/or traffic congestions.

IEEE 802.11p can be a standard supporting ITS applications in vehicular ad hoc networks (VANETs). An efficient deployment, a low cost, and a capability to natively support V2V communications in an ad-hoc mode can be among its advantages. Nonetheless, this technology can suffer from scalability issues, unbounded delays, and a lack of deterministic QoS limits. Furthermore, due to its limited radio range and without a pervasive roadside communication infrastructure, IEEE 802.11p may only offer intermittent and short-lived vehicle-to-infrastructure (V2I) connectivity. Moreover, IEEE 802.11p may not support vehicle-to-device (V2D) applications, mainly due to regulations at the 5.9 GHz frequency band, e.g. because a transmit power of 2 W of 802.11p may not be possible for handheld devices, and due to scalability issues of IEEE 802.11p.

Long term evolution (LTE) can be a promising wireless broadband technology that can provide a high data rate and a low latency to mobile communication devices. Like further cellular communication systems, it can benefit from a large coverage area, a high penetration, and a high-speed mobile communication device support. Extending its use to also support vehicular applications can open new opportunities to telecommunication operators and service providers. A main concern can come from the centralized LTE architecture, i.e. communications may always cross infrastructure nodes, even though only a localized V2V data exchange may be desired, as for safety-critical related applications, with negative consequences e.g. on latency. In addition, in dense traffic areas, the heavy traffic load generated by periodic message transmissions from several vehicles can challenge LTE capacity and can potentially penalize a delivery of traditional applications. Moreover, current LTE may not support vehicle-to-X (V2X) communications when communication network coverage does not exist, e.g. in rural or mountain areas, or tunnel scenarios in urban cities.

Figure 4:
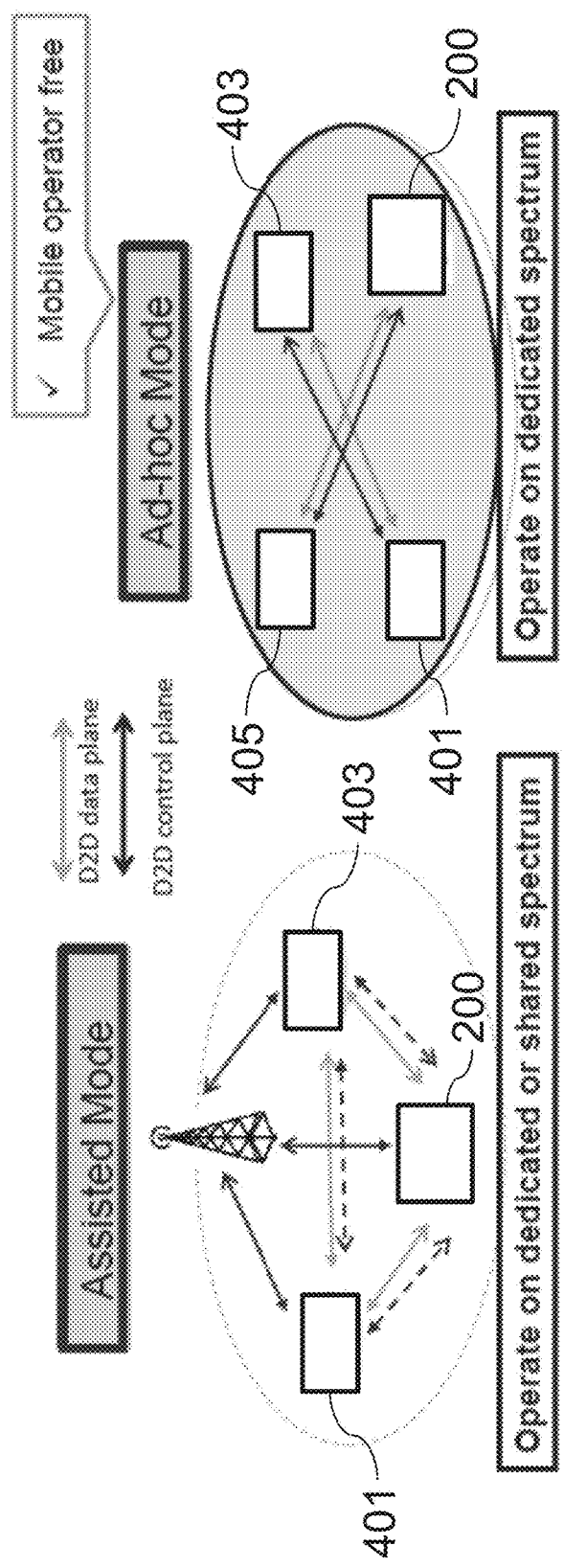
FIG. 4 shows a diagram of a communication scenario in an ad-hoc mode and a network-assisted mode according to an embodiment.

FIG. 4 shows a diagram of a communication scenario in an ad-hoc mode and a network-assisted mode according to an embodiment. The diagram depicts a communication device 200 and neighboring devices 401, 403, 405. The communication device 200 forms a possible implementation of the communication device 200 as described in conjunction with FIG. 2. The neighboring devices 401, 403, 405 can be further communication devices 200 as described in conjunction with FIG. 2. The diagram illustrates mission-critical device-to-device (D2D) communications being performed within the ad-hoc mode and the network-assisted mode.

Cellular $5^{th}$ generation (5G) device-to-device (D2D) communications for V2X services can be employed within the following specifications. They can support high reliable communication signal transmissions with a low latency, can enable V2X services of both hard QoS and soft QoS specifications, e.g. having different priorities with regard to communication resource allocation, can extend traffic safety and efficiency services to V2X traffic participants, can enable approximately 100% availability, and can even work without communication network assistance and/or coverage.

The D2D framework can include a D2D ad-hoc mode and a network-assisted mode. Both modes can coexist with a legacy cellular mode, which can complement each other in order to provide an entire V2X solution.

In the network-assisted mode, the cellular communication network can provide a fine-grained physical layer synchronization and a high degree of control of D2D communications via a radio resource control (RRC) signaling, e.g. using a coordinated resource allocation, a system information broadcast mode selection, a power control, and a differentiated QoS support with priority handling. This mode can be preferred when applicable. The communication network operator can be willing to support it or may have enough radio communication resources to support it.

In the ad-hoc mode, fully distributed ad-hoc communications among vV2X communication devices can take place in both data and control plane. It can be an operator free solution. It can be used when the operator may not provide cellular communication network coverage in certain areas, e.g. rural areas, mountain areas, or tunnel areas, or if the operator is not able and/or willing to support V2X applications. Limited communication network assistance may be provided.

Four challenges of providing V2X services can be tackled. Firstly, a high reliability and a low latency can be provided. Secondly, the high availability can be provided with and without cellular communication network support. Thirdly, a mix of V2X service profiles with hard QoS and soft QoS specifications can be provided. Fourthly, the approach can be extended to V2X communication devices beyond vehicle-to-vehicle scenarios.

Two approaches can be employed. Firstly, a unified MAC frame structure 100 that can support a D2D ad-hoc mode, and a D2D network-assisted mode, and which can coexist with legacy LTE, can be employed. This can lead to a high availability, a high reliability, and a low latency. Furthermore, hard quality of service and soft quality of service specifications, e.g. with different priorities and different communication channel access schemes can be supported. Furthermore, different V2X communication devices can be supported, e.g. using discontinuous reception (DRX) for battery-limited communication devices. Secondly, a MAC protocol for the D2D ad-hoc mode can be provided, which can be built on top of the unified MAC frame structure 100. The protocol can be a distributed synchronous MAC protocol for the ad-hoc mode. It can use a distributed spatial time division multiple access (TDMA) scheme for providing a low latency channel access. It can use a distributed communication resource reservation and/or a carrier sensing based re-reservation scheme for transmissions with minimized collisions.

The described approach can tackle the four challenges of V2X services. A MAC protocol for the network-assisted mode, a state transition protocol between the two modes, and protocols between the different modes can further be applied. The unified MAC frame structure 100 can be provided as a basis for developing further entire $5^{th}$ generation (5G) cellular D2D based V2X solutions. The described approach can include two aspects. Firstly, a unified MAC frame structure 100 can be applied. Secondly, a distributed MAC protocol for the ad-hoc mode can be applied.

Figure 5:
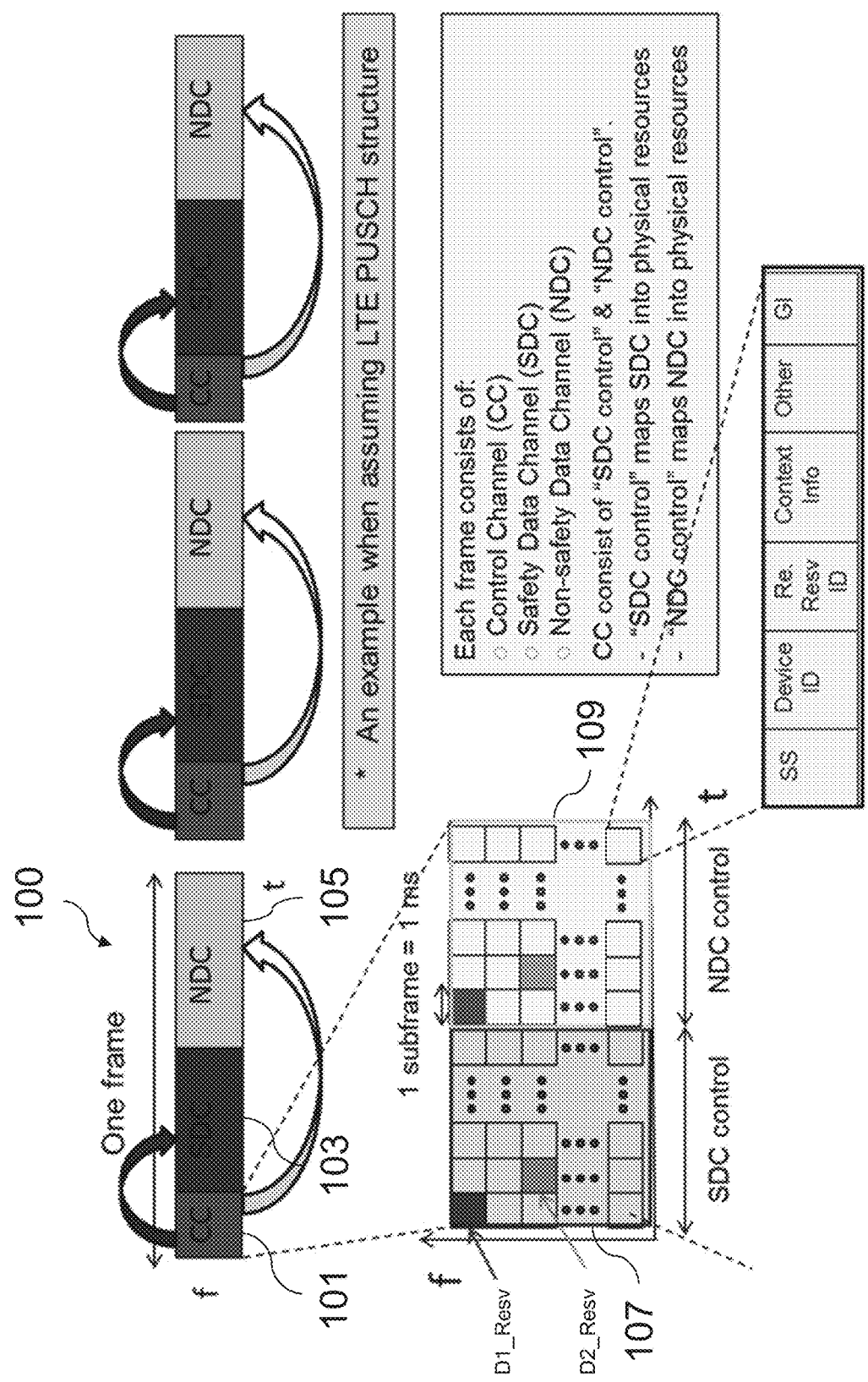
FIG. 5 shows a diagram of a frame structure including high priority data and low priority data according to an embodiment.

FIG. 5 shows a diagram of a frame structure 100 including high priority data and low priority data according to an embodiment. The diagram relates to the unified frame structure 100 in ad-hoc mode. The frame structure 100 forms a possible implementation of the frame structure 100 as described in conjunction with FIG. 1.

The frame structure 100 includes a control channel 101, a high priority data channel 103, and a low priority data channel 105, where the control channel 101 includes a high priority data channel control portion 107 indicating a first communication resource associated with the high priority data, and a low priority data channel control portion 109 indicating a second communication resource associated with the low priority data, where the high priority data is arranged within the high priority data channel 103 at the second communication resource, and where the low priority data is arranged within the low priority data channel 105 at the third communication resource. The control channel 101, in particular the high priority data channel control portion 107 and the low priority data channel control portion 109, the high priority data channel 103, and the low priority data channel 105, can respectively include a pool of time domain resources, a pool of frequency-domain resources, and/or a pool of coding sequences, as part of the respective first, second and/or third communication resource.

The realization of the unified frame structure 100 in ad-hoc mode is given under the assumption of using an LTE physical uplink shared channel (PUSCH) channel structure.

Each frame structure 100 can include the control channel (CC) 101, where communication devices 200 can listen and decode as well as encode and send data items, a high priority data channel 103 being referred to as safety data channel (SDC), where each communication device 200 can decode and encode communication on specific communication resources, e.g. the second communication resource, for reception if it is paged in a CC, and where each communication device 200 can transmit e.g. transmission high priority data on its reserved specific communication resource, e.g. the second communication resource, and a low priority data channel 105 being referred to as non-safety data channel (NDC), where each communication device 200 can receive low priority data and transmit transmission low priority data, e.g. soft QoS V2X traffic data, on specific communication resources, e.g. the third communication resource. Whereas a first communication resource is related to the control channel and carries the control data for the other channels or resources, respectively.

The CC 101 can include a high priority data channel control portion 107 being referred to as SDC control portion, and a low priority data channel control portion 109 being referred to as NDC control portion.

The high priority data channel control portion 107, e.g. the SDC control portion, of the CC 101 can map the high priority data channel 103, e.g. the SDC portion, into physical communication resources with high priority, e.g. using distributed communication resource reservations. After the high priority data channel control portion 107, e.g. the SDC control portion, the low priority data channel control portion 109, e.g. the NDC control portion, of the CC 101 can map the low priority data channel 105, e.g. the NDC portion, into physical communication resources with low priority, e.g. using distributed communication resource reservations.

The CC 101 can have a permanent communication resource, e.g. used for a L1/L2 control among communication devices. The CC length or size can be configurable, e.g. based on a communication device density. A multi-user CC access protocol can be used.

The CC 101 can enable a fine-tuned synchronization, a direct neighboring device discovery, a paging, a communication resource reservation for high priority data and low priority data, e.g. hard and soft QoS traffic data, and can be used for exchanging communication device context information, e.g. a geographic position of a communication device 200.

The high priority data channel 103, e.g. the SDC portion, can be reserved for high priority data, e.g. hard QoS safety V2X traffic data, with high priority, which can be performed at the first portion of the CC 101, e.g. the high priority data channel control portion 107, e.g. the SDC control portion. It can support mixed data or traffic types, e.g. semi-persistent communication resource patterns for cooperative awareness message (CAM) periodical messages, and/or an on-demand communication resource reservation for context-rich mission-critical data (CMD). A multi-user high priority data channel communication resource reservation protocol can be used.

The low priority data channel 105, e.g. the NDC portion, can serve low priority data, e.g. soft QoS V2X traffic data, with low priority, e.g. traffic efficiency application data, in the second part of CC 101, e.g. the low priority data channel control portion 109, e.g. the NDC control portion. It can give up priority for high priority data, e.g. hard quality of service (QoS) safety traffic data. A multi-user communication resource coordination in the low priority data channel 105, e.g. the NDC portion, can be based on an on-demand reservation scheme or a carrier sense multiple access (CSMA) type reservation scheme.

The communication resources of the high priority data channel 103, e.g. the SDC portion, and the low priority data channel 105, e.g. the NDC portion, can be multiplexed in frequency domain and/or time domain and/or in a code domain.

Figure 6:
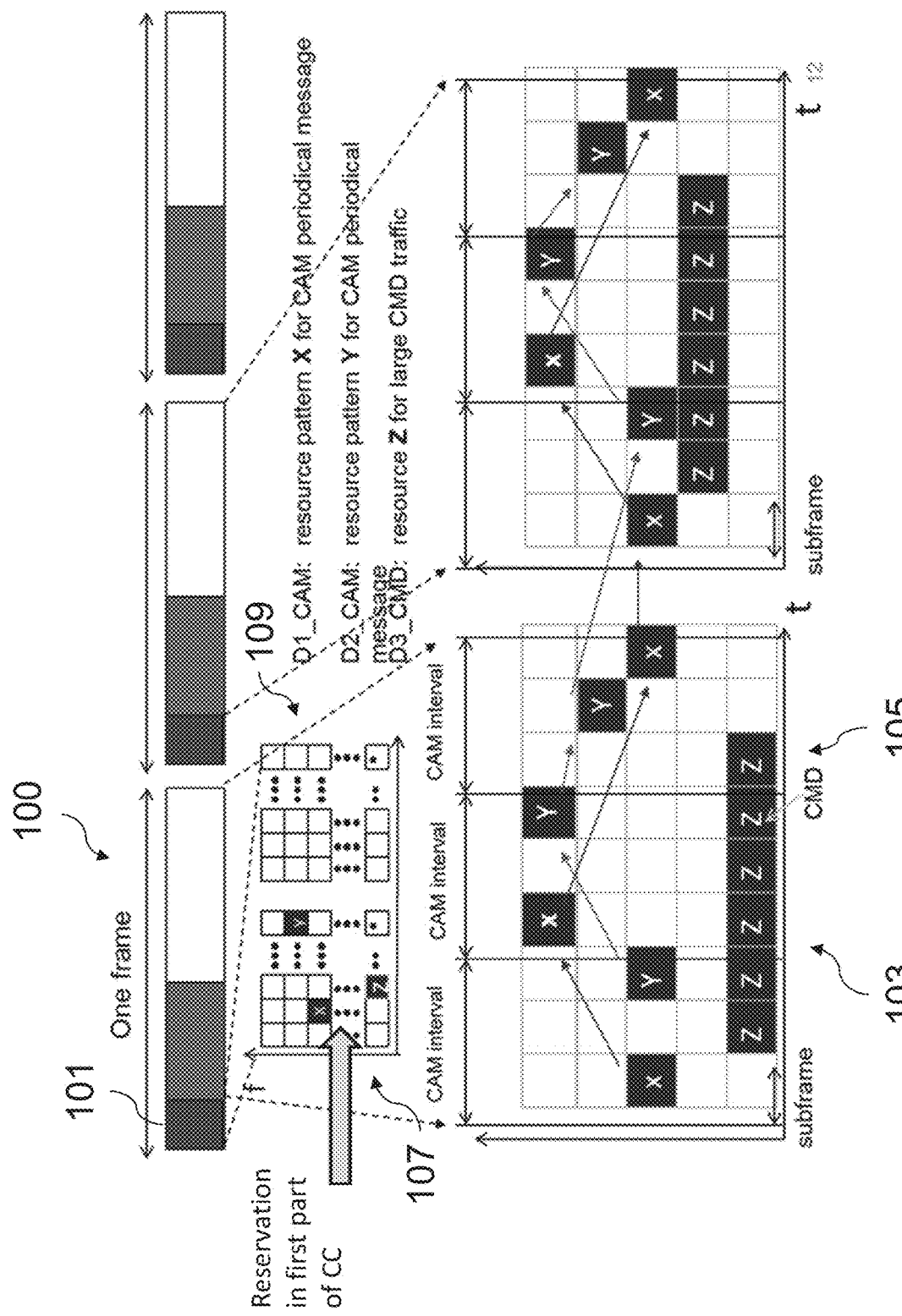
FIG. 6 shows a diagram of a frame structure including high priority data and low priority data according to an embodiment.

FIG. 6 shows a diagram of a frame structure 100 configured to communicate high priority data and low priority data according to an embodiment. The diagram relates in particular to a high priority data channel 103, e.g. an SDC portion, using the unified frame structure 100 in ad-hoc mode. The frame structure 100 forms a possible implementation of the frame structure 100 as described in conjunction with FIG. 1.

The frame structure 100 is configured to communicate high priority data, low priority data. The frame structure includes a control channel 101, a high priority data channel 103, and a low priority data channel 105, where the control channel, which is related to a first communication resource, 101 includes a high priority data channel control portion 107 configured to communicate control data related to the high priority data channel over a second communication resource, and a low priority data channel control portion 109 configured to communicate control data related to the low priority data channel over a third communication resource, where the high priority data is arranged within the high priority data channel 103 at the second communication resource, and where the low priority data is arranged within the low priority data channel 105 at the third communication resource. The control channel 101, in particular the high priority data channel control portion 107 and/or the low priority data channel control portion 109, the high priority data channel 103, and the low priority data channel 105, can respectively include a number of resource blocks, where a resource block can include a time domain resource, a frequency domain resource, and/or a coding sequence resource.

The diagram shows an example on how physical communication resources of the high priority data channel 103, e.g. the SDC portion, can be mapped by the CC 101 in the ad-hoc mode. The diagram further illustrates how the high priority data channel 103, e.g. the SDC portion, can be mapped into the physical communication resource, whereas an adapted protocol will be described.

Communication device 1 (D1) can reserve a communication resource pattern (X), e.g. for high priority data and/or low priority data, e.g. a CAM periodical message, in the CC 101. Communication device 2 (D2) can reserve a communication resource pattern (Y), e.g. for high priority data and/or low priority data, e.g. a CAM periodical message, in the CC 101. Communication device 3 (D3) can reserve a communication resource (Z), e.g. for high priority data and/or low priority data, e.g. large context-rich mission-critical data (CMD) traffic data, in the CC 101. Communication device 1 (D1) can e.g. be a communication device 200 as described in conjunction with FIG. 2. Communication device 2 (D2) and communication device 3 (D3) can e.g. be neighboring devices 401, 403 as described in conjunction with FIG. 4.

The bottom of the figure shows how the physical communication resources X, Y, and Z, e.g. high priority data channel communication resources or SDC communication resources, are represented in frequency domain and in time domain. In an embodiment, the physical communication resources X, Y, and Z form possible implementations of the first communication resource, the second communication resource, the third communication resource, or parts of these resources, respectively. Data, in particular from different devices, can be communicated using these or other communication resources that are represented by the squares (resources blocks) of the diagram, that represents frequency and time resources in this case.

Figure 7:
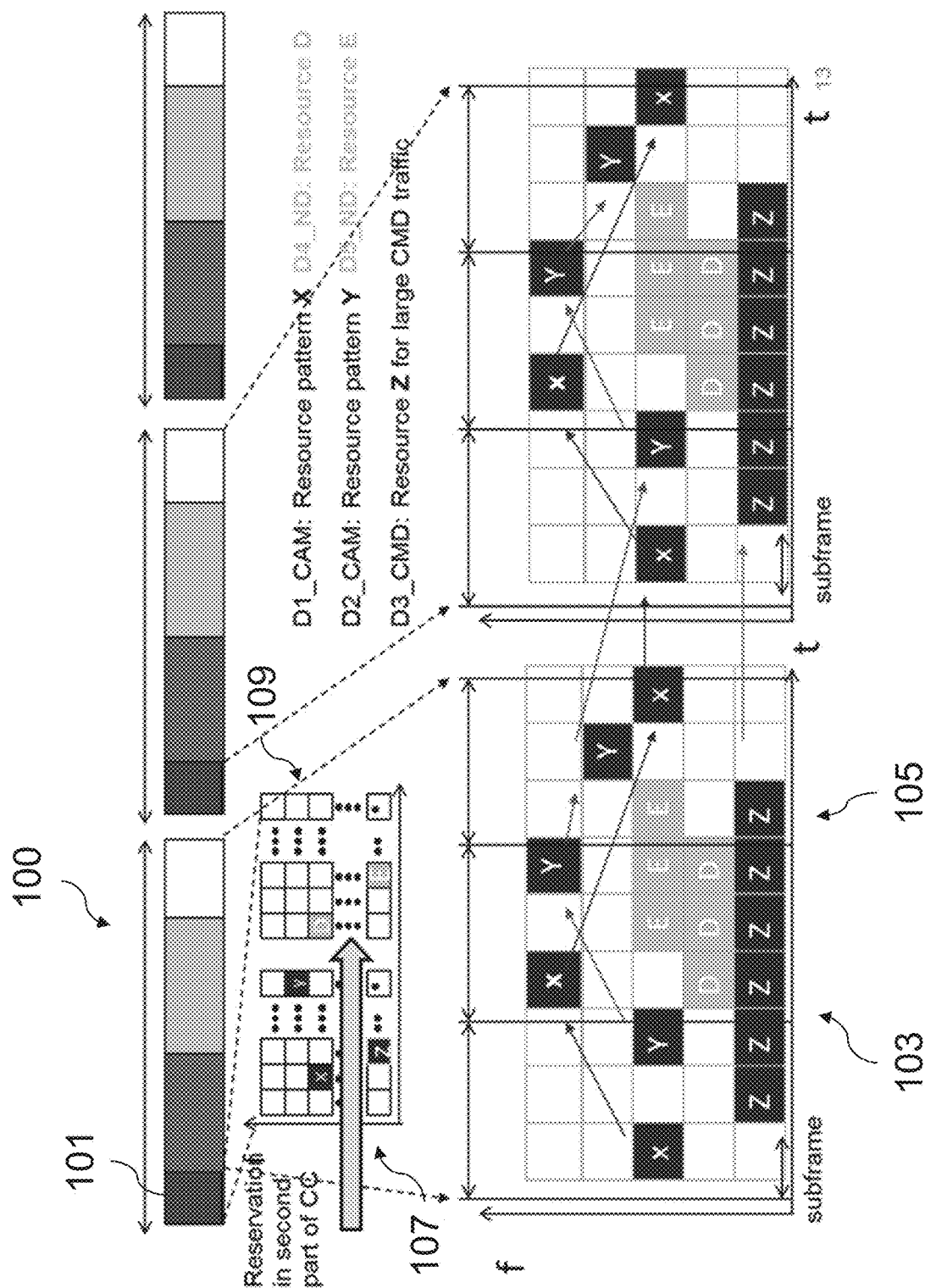
FIG. 7 shows a diagram of a frame structure including high priority data and low priority data according to an embodiment.

FIG. 7 shows a diagram of a frame structure 100 including control data, high priority data and low priority data according to an embodiment. The diagram relates in particular to a low priority data channel 105, e.g. a NDC portion, using the unified frame structure 100 in ad-hoc mode. The frame structure 100 forms a possible implementation of the frame structure 100 as described in conjunction with FIG. 1.

The frame structure 100 communicates high priority data, low priority data, a control channel 101, a high priority data channel 103, and a low priority data channel 105, where the control channel 101 includes a high priority data channel control portion 107, where the high priority data is communicated over the high priority data channel 103 using the second communication resource, and where the low priority data is communicated over the low priority data channel 105 using the third communication resource. The control channel 101, in particular the high priority data channel control portion 107 and the low priority data channel control portion 109, the high priority data channel 103, and the low priority data channel 105, can respectively include a number of sub-frames in time domain, and/or a number of frequency channels, and/or a number of coding sequences.

The diagram shows, after communication resources of the high priority data channel 103, e.g. the SDC portion, are reserved, how communication resources of the low priority data channel 105, e.g. the NDC portion, can be reserved from the rest of available communication resources.

Communication device 4 (D4) and communication device 5 (D5) can firstly monitor the high priority data channel control portion 107, e.g. the SDC control portion, of the CC 101 and can determine already reserved communication resources of the high priority data channel 103, e.g. the SDC portion. They can then select a further communication resource (D) and a further communication resource (E) from the rest of available communication resources in the low priority data channel control portion 109, e.g. the NDC control portion, of the control channel (CC) 101 as communication resources of the low priority data channel 105, e.g. the NDC portion. Communication device 1 (D1) can e.g. be a communication device 200 as described in conjunction with FIG. 2. Communication device 2 (D2) and communication device 3 (D3) can e.g. be neighboring devices 401, 403 as described in conjunction with FIG. 4. Communication device 4 (D4) can be a neighboring device 405 as described in conjunction with FIG. 4. Communication device 5 (D5) can be a further neighboring device.

The content of the CC 101, the high priority data channel 103, e.g. the SDC portion, and the low priority data channel 105, e.g. the NDC portion, in ad-hoc mode can be as follows.

A message within the CC 101 can include a synchronization sequence, e.g. a primary synchronization sequence (PSS) or secondary synchronization sequence (SSS), and can indicate a type of a synchronization source and its accuracy. It can further include a communication device identification (ID), a reserved communication resource ID, e.g. indicating a frequency and/or time of the communication resource, or a communication resource hopping pattern, and can indicate a duration, e.g. a reservation duration over a predetermined number of communication cycles. It can further include context information of the communication device 200 or neighboring devices 401, 403, 405, e.g. a geographic position, e.g. to enable an application of a spatial aware MAC protocol. It can further include one-hop neighboring device information, e.g. a communication device ID, a reserved communication resource ID, and a channel quality indicator (CQI) per physical resource block (PRB), e.g. to provide channel state information (CSI) feedback and/or to cope with a hidden communication device problem.

A message within the high priority data channel 103, e.g. the safety data channel (SDC) portion, can include a synchronization sequence, e.g. a PSS or SSS, and can indicate a type of a synchronization source and its accuracy. It can further include a communication device ID, and a reserved communication resource ID, and can indicate a duration, and/or a geographic position of the communication device 200 or neighboring devices 401, 403, 405, e.g. to provide redundancy on CC information or to improve a reliability of reception of the CC 101. It can further include the high priority data, i.e. a data payload.

A message within the low priority data channel 105, e.g. the non-safety data channel (NDC) portion, can include a synchronization sequence, e.g. a PSS or secondary SSS, and can indicate a type of a synchronization source and its accuracy. It can further include the low priority data, i.e. a data payload.

Figure 8:
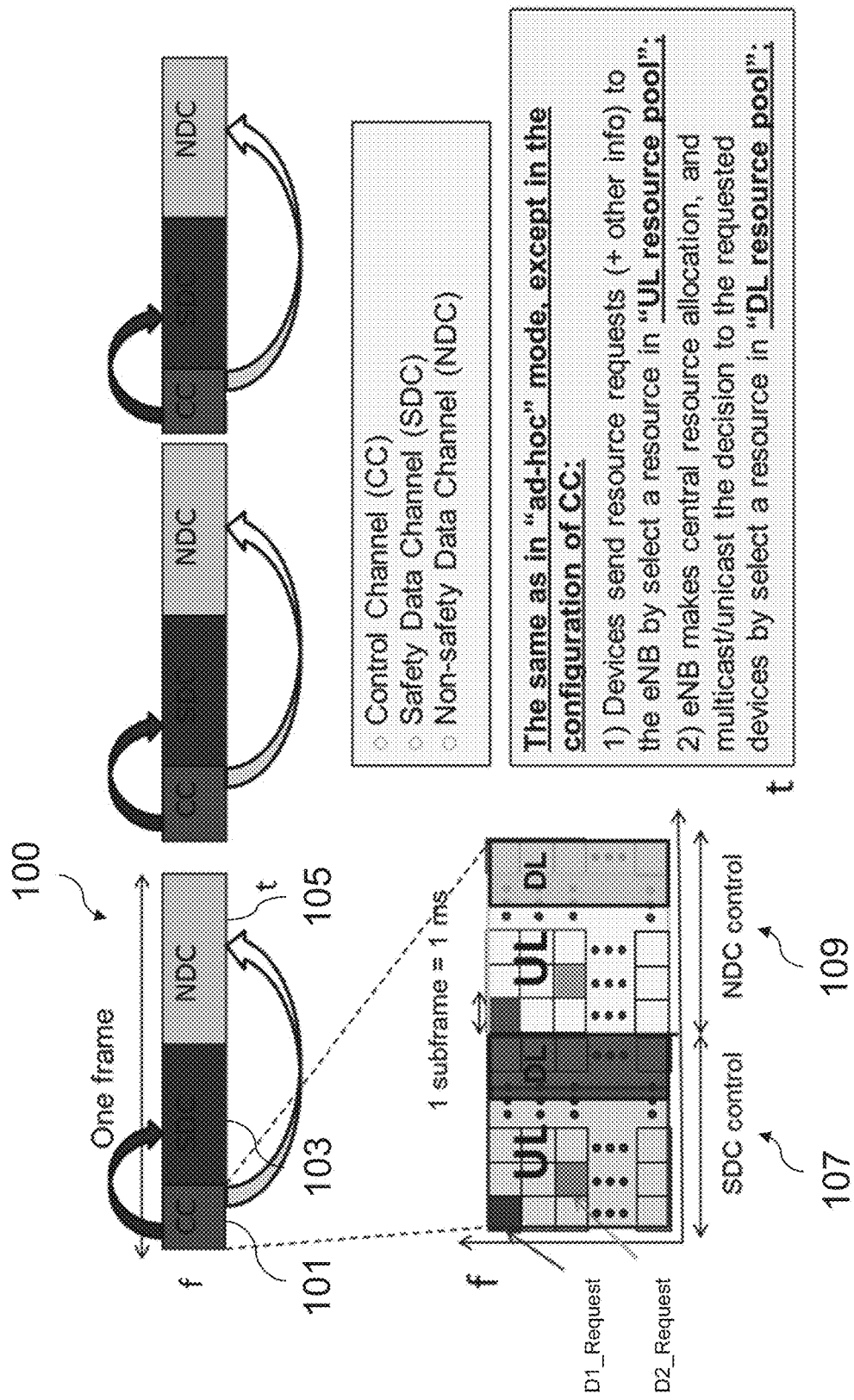
FIG. 8 shows a diagram of a frame structure including high priority data and low priority data according to an embodiment.

FIG. 8 shows a diagram of a frame structure 100 configured to communicate high priority data and low priority data according to an embodiment. The diagram relates in particular to the unified frame structure 100 in network-assisted mode on a dedicated frequency spectrum. The frame structure 100 forms a possible implementation of the frame structure 100 as described in conjunction with FIG. 1.

The frame structure 100 communicates control data, high priority data, low priority data, it includes a control channel 101, a high priority data channel 103, and a low priority data channel 105, where the control channel 101 includes a high priority data channel control portion 107, and a low priority data channel control portion 109, and where the control data is arranged within the control channel using the first communication resource, where the high priority data is arranged within the high priority data channel using the second communication resource, and where the low priority data is arranged within the low priority data channel 105 at the third communication resource. The control channel 101, in particular the high priority data channel control portion 107 and the low priority data channel control portion 109, the high priority data channel 103, and the low priority data channel 105, can respectively include a number of sub-frames, a number of frequency channels and/or a set of coding sequences.

Figure 9:
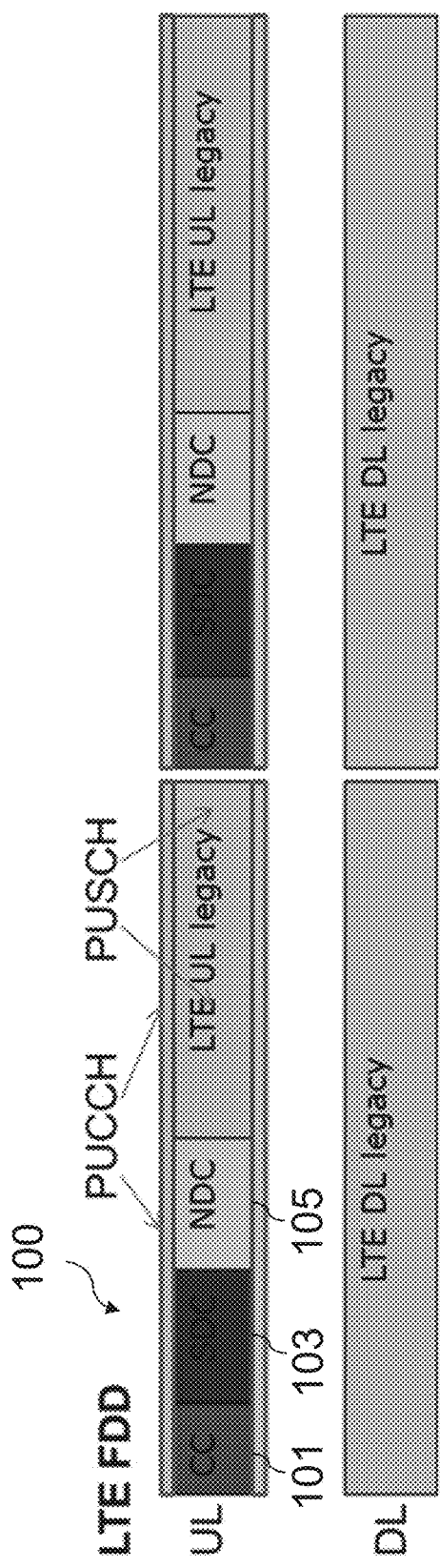
FIG. 9 shows a diagram of a frame structure including high priority data and low priority data according to an embodiment.

In the following, a realization of the unified MAC frame structure 100 in network-assisted mode or ad-hoc mode is described under the assumption of re-using an LTE PUSCH channel structure and on a dedicated frequency spectrum. An embodiment is depicted in FIG. 9.

The frame structure 100 in network-assisted mode is generally the same as in the ad-hoc mode, which includes the CC 101, the high priority data channel 103, e.g. an SDC portion, and the low priority data channel 105, e.g. an NDC portion, where the CC 101 can map physical communication resources of the high priority data channel 103, e.g. the SDC portion, and the low priority data channel 105, e.g. the NDC portion. An exception can be the structure of the CC 101, where a hierarchically superior communication network controller, e.g. an evolved node B (eNB), can perform centralized communication resource coordination.

In a network-assisted mode, in a first step, the communication device 200 can send communication resource requests, and further information, to the hierarchically superior communication network controller, e.g. the eNB, by selecting a communication resource in an uplink (UL) communication resource pool, e.g. within the high priority data channel control portion 107 and/or the low priority data channel control portion 109. The UL communication resource pool can be referred to as uplink portion.

In a second step, the hierarchically superior communication network controller, e.g. the eNB, can perform centralized communication resource allocation, and can multicast and/or unicast the communication resource decision to the requested communication device 200 by selecting a communication resource in a downlink (DL) communication resource pool, e.g. within the high priority data channel control portion 107 and/or the low priority data channel control portion 109. The DL communication resource pool can be referred to as downlink portion.

FIG. 9 shows a diagram of a frame structure 100 communicating high priority data and low priority data according to an embodiment. The diagram relates to the unified frame structure 100 in network-assisted mode on a shared frequency spectrum with legacy LTE. The frame structure 100 forms a possible implementation of the frame structure 100 as described in conjunction with FIG. 1.

The frame structure 100 includes high priority data, low priority data, a control channel 101, a high priority data channel 103, and a low priority data channel 105. The high priority data is arranged within the high priority data channel 103 at the second communication resource, and the low priority data is arranged within the low priority data channel 105 at the third communication resource.

In the following, a realization of the unified MAC frame structure 100 in network-assisted mode or ad-hoc mode on a shared frequency spectrum coexisting with legacy LTE is described in more detail. An embodiment is depicted in FIG. 9.

A communication resource of the CC 101 can be permanently allocated in an UL frequency band of LTE. A communication resource of the high priority data channel 103, e.g. the SDC portion, can be reserved and can have a higher priority than the low priority data channel 105, e.g. the NDC portion, and legacy LTE UL communications. A communication resource of the low priority data channel 105, e.g. the NDC portion, and the legacy LTE UL communications can be multiplexed with equal priority, e.g. having a lower priority than the high priority data channel 103, e.g. the SDC portion, or can depend on pre-defined priority policies. The frame structure 100 can be embedded within a PUSCH and/or a PUCCH.

For a LTE time division duplexing (TDD) communication signal, the described frame structure 100 can be interpreted as UL sub-frame of a TDD frame.

Figure 10:
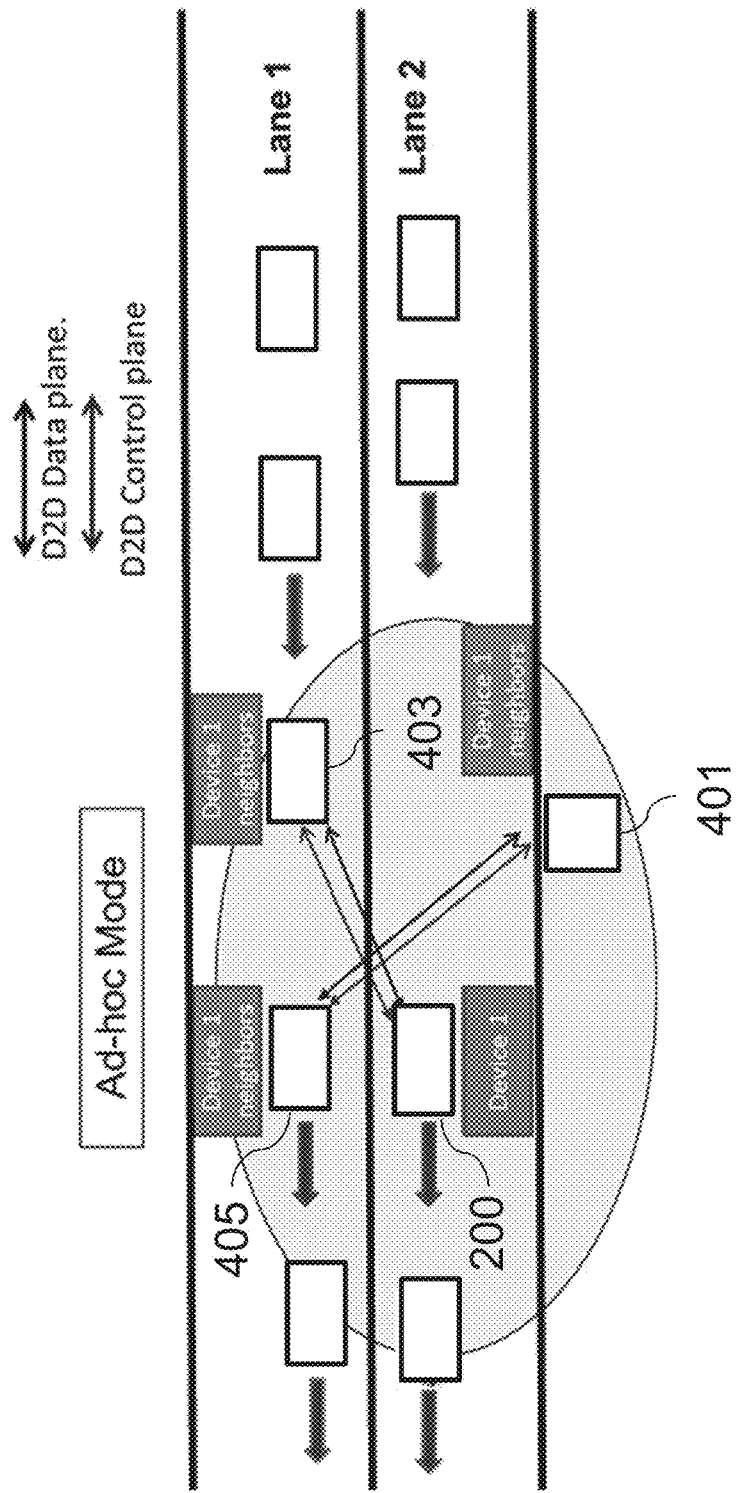
FIG. 10 shows a diagram of a communication scenario in an ad-hoc mode according to an embodiment.

FIG. 10 shows a diagram of a communication scenario in an ad-hoc mode according to an embodiment. The diagram depicts a communication device 200 and neighboring devices 401, 403, 405. The communication device 200 forms a possible implementation of the communication device 200 as described in conjunction with FIG. 2. The neighboring devices 401, 403, 405 can be further communication devices 200 as described in conjunction with FIG. 2. The diagram relates to a communication scenario in ad-hoc mode and illustrates a distributed MAC protocol for the ad-hoc mode.

A realization of the distributed MAC protocol for the ad-hoc mode is described, where there may not be cellular network assistance available. The communication device 200 can be arranged within a car which is focused in the following. In the described highway rural area scenario, there may be two lanes in the same direction.

In the coverage area of communication device 200, there may be three neighboring devices 401, 403, 405, e.g. arranged within two cars and carried by one pedestrian. The neighboring devices 401, 403, 405 of the communication device 200 can change over time, e.g. some devices may leave the coverage area of communication device 200, whereas other devices may join. Within the coverage area of communication device 200, both control plane and data plane communications between communication device 200 and its neighboring devices 401, 403, 405 can take place in an ad-hoc peer-to-peer manner.

Figure 11:
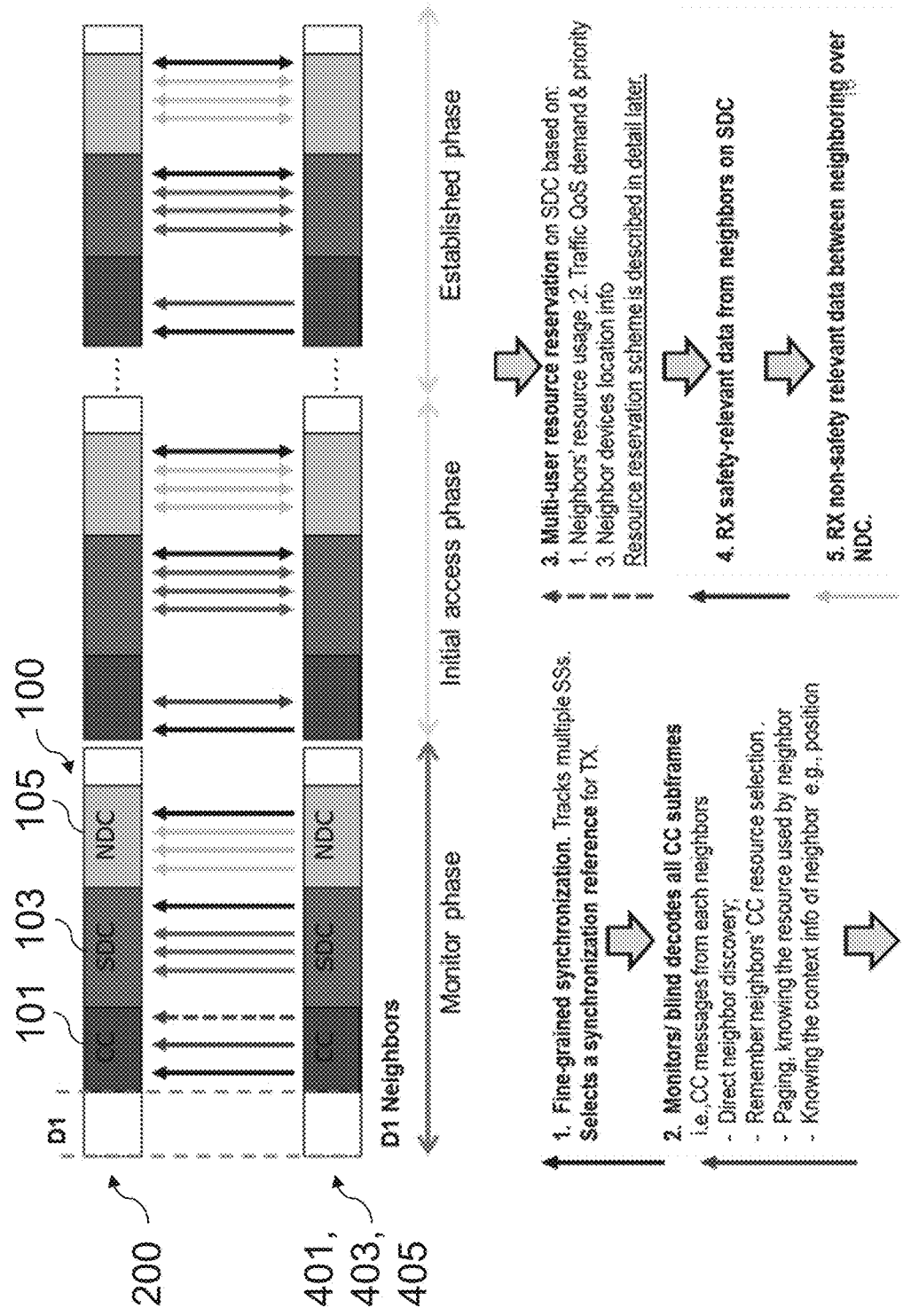
FIG. 11 shows a diagram of a protocol for communications between a communication device and neighboring devices in an ad-hoc mode according to an embodiment.

FIG. 11 shows a diagram of a protocol for communications between a communication device 200 and neighboring devices 401, 403, 405 in an ad-hoc mode according to an embodiment. The diagram provides an overview of the MAC protocol for the ad-hoc mode. The protocol is based on the frame structure 100, where the frame structure 100 forms a possible implementation of the frame structure 100 as described in conjunction with FIG. 1.

The frame structure 100 communicates high priority data, low priority data. It includes a control channel 101, a high priority data channel 103, and a low priority data channel 105. The high priority data is arranged within the high priority data channel 103 at the second communication resource, and the low priority data is arranged within the low priority data channel 105 at the third communication resource.

The protocol can include a monitor phase, an initial access phase, and an established phase. The direction of the arrows in the upper part of the figure indicates a direction of communication between the communication device 200 (D1) and its neighboring devices 401, 403, 405 (D1 neighbors).

Firstly, a fine-grained synchronization can be performed, where e.g. multiple SSS from the neighboring devices 401, 403, 405 can be evaluated by the communication device 200. Furthermore, a synchronization reference for transmission (TX) can be selected by the communication device 200.

Secondly, sub-frames of the CC 101, e.g. all sub-frames of the CC 101, can be monitored and can be blindly decoded, e.g. to provide messages within the CC 101 from each neighboring device 401, 403, 405. Thus, a direct neighboring device discovery can be performed by the communication device 200, where the communication resource selection of the CC 101 of the neighboring devices 401, 403, 405 can be remembered or stored. Moreover, a paging can be performed, where the communication resources used by the neighboring devices 401, 403, 405 can be known. Furthermore, context information of the neighboring devices 401, 403, 405, e.g. geographic positions, can be known.

Thirdly, a multi-user communication resource reservation on the high priority data channel 103, e.g. the SDC portion, can be performed based e.g. on the communication resource usage of the neighboring devices 401, 403, 405, on traffic QoS demands and priorities, and/or on position information of the neighboring devices 401, 403, 405. An applicable communication resource reservation scheme will be described later.

Fourthly, high priority data, e.g. safety relevant data, can be received and/or send by the communication device 200 from the neighboring devices 401, 403, 405 on the high priority data channel 103, e.g. the SDC portion.

Fifthly, low priority data, e.g. non-safety relevant data, can be received and/or send by the communication device 200 from the neighboring devices 401, 403, 405 on the low priority data channel 105, e.g. the NDC portion.

Figure 12:
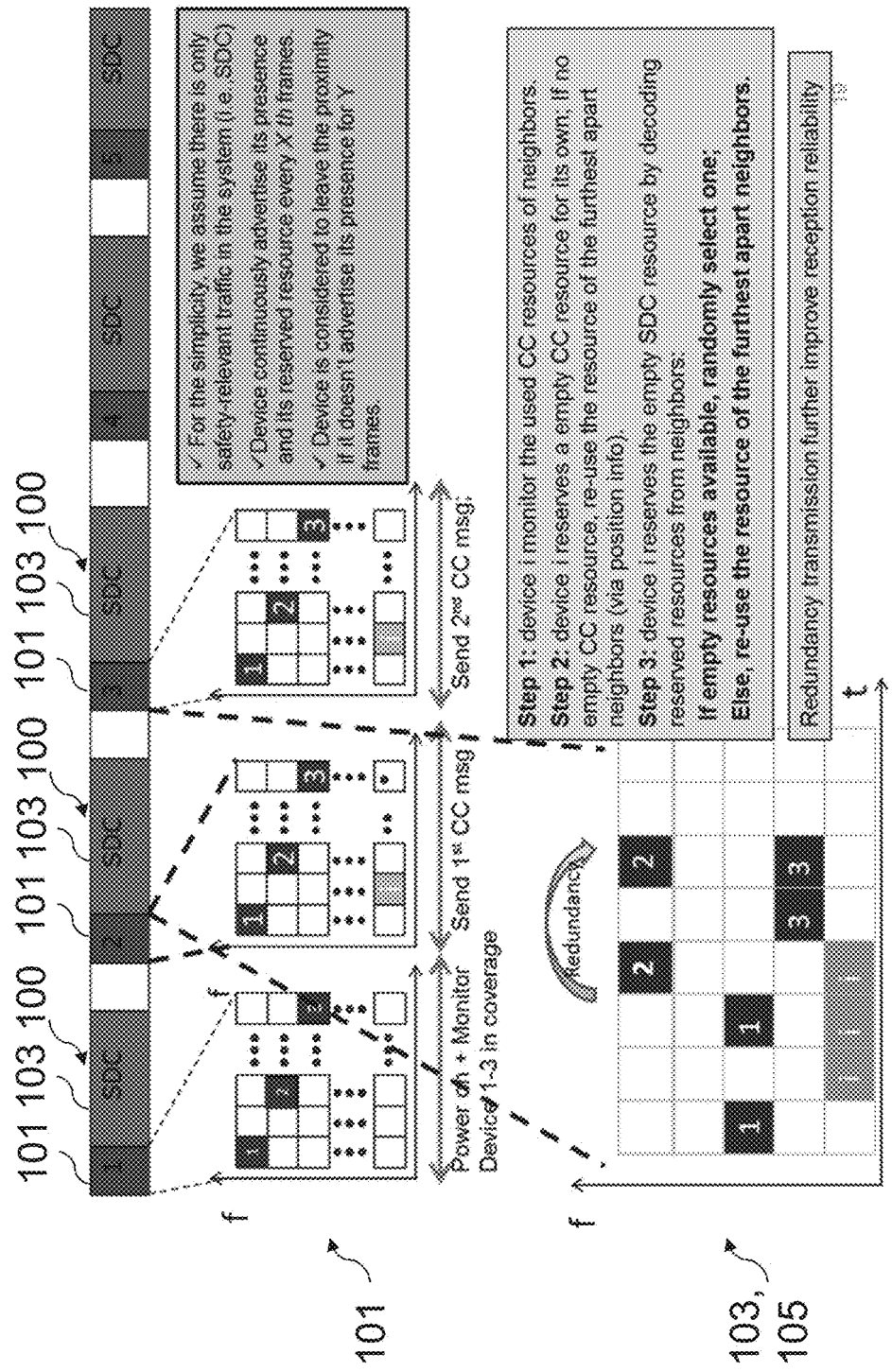
FIG. 12 shows a diagram of a protocol for communications between a communication device and neighboring devices in an ad-hoc mode according to an embodiment.

FIG. 12 shows a diagram of a protocol for communications between a communication device and neighboring devices in an ad-hoc mode according to an embodiment. The depicted embodiment can be the same embodiment as disclosed in FIGS. 13 and 14. A more precise description can be seen in FIG. 16. The diagram provides an overview of the distributed communication resource reservation protocol. The protocol is based on the frame structure 100, where the frame structure 100 forms a possible implementation of the frame structure 100 as described in conjunction with FIG. 1.

The frame structure 100 includes a control channel 101, a high priority data channel 103, and a low priority data channel 105. The high priority data is arranged within the high priority data channel 103 at the second communication resource, and the low priority data is arranged within the low priority data channel 105 at the third communication resource.

For simplicity, it is assumed that there is only high priority data, e.g. safety relevant traffic data, i.e. the high priority data channel 103, e.g. the SDC portion, is used. The communication device can continuously advertise its presence and its reserved communication resource e.g. every X-th frame structure 100. The communication device can be considered to leave the proximity if it doesn't advertise its presence for Y number of frame.

In a first step, a power-on operation of a communication device i can be performed, and neighboring devices 1 to 3 in coverage can be monitored. In a second step, a first message within the CC 101 can be sent. In a third step, a second message within the CC 101 can be sent. A redundancy transmission, in particular in the control channel, can further improve the reception reliability.

In the first step, the communication device i, can monitor used communication resources of the neighboring devices 1 to 3 within the CC 101. In a second step, the communication device i can reserve an empty communication resource within the CC 101 for its own. If no empty communication resource within the CC 101 is available, the communication resource of the furthest apart neighboring device 1 to 3 can be re-used, e.g. based on position information. In a third step, the communication device i can reserve the empty communication resource of the high priority data channel 103, e.g. the SDC portion, by decoding reserved communication resources from the neighboring devices 1 to 3. If empty communication resources are available, one can be randomly selected. Else, the communication resource of the furthest apart neighboring device 1 to 3 can be re-used.

The communication device i can form a possible implementation of the communication device 200 as described in conjunction with FIG. 2. The neighboring devices 1 to 3 can form possible implementations of the neighboring devices 401, 403, 405 as described in conjunction with FIG. 4.

Figure 13:
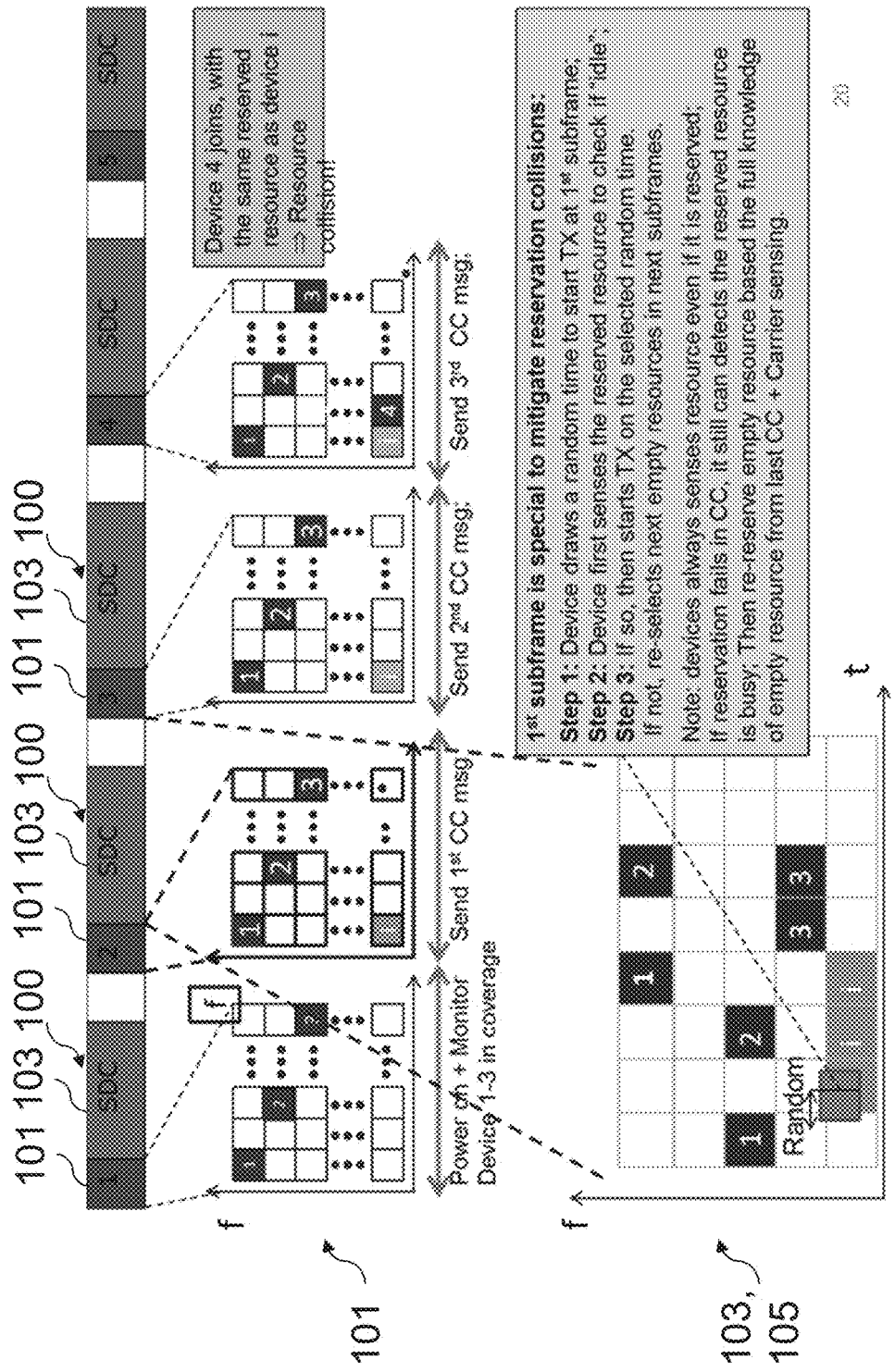
FIG. 13 shows a diagram of a protocol for communications between a communication device and neighboring devices in an ad-hoc mode according to an embodiment.

FIG. 13 shows a diagram of a protocol for communications between a communication device and neighboring devices in an ad-hoc mode according to an embodiment. The diagram shows a carrier sensing based re-reservation within the protocol. The protocol is based on the frame structure 100, where the frame structure 100 forms a possible implementation of the frame structure 100 as described in conjunction with FIG. 1.

The frame structure 100 includes a control channel 101, a high priority data channel 103, and a low priority data channel 105. The high priority data is arranged within the high priority data channel 103 at the second communication resource, and the low priority data is arranged within the low priority data channel 105 at the third communication resource. Control data is arranged within the control channel.

In a first step, a power-on operation of the communication device i can be performed, and neighboring devices 1 to 3 in coverage can be monitored. In a second step, a first message within the CC 101 can be sent. In a third step, a second message within the CC 101 can be sent. In a fourth step, a third message within the CC 101 can be sent. When neighboring device 4 joins with the same reserved communication resource, in particular for safety-relevant communications, as communication device i, a communication resource collision can occur.

The first sub-frame of the reserved SDC communication resource can be special in order to mitigate reservation collisions. In the first step, the communication device i can draw a random transmission delay time to start the transmission at the first sub-frame. In the second step, during the delay time of the first step, the communication device i can firstly sense the reserved communication resource in order to check whether it is idle. In the third step, if it is the case, then it can start the transmission based on the selected random transmission delay time. If not, it can re-select the next empty communication resource in a next sub-frame.

The communication device i can always sense SDC communication resources even if it is reserved. If the reservation fails in the CC 101, it can still detect that the reserved communication resource is busy. Then, a re-reservation of an empty communication resource based on the full knowledge of empty communication resources from the last CC 101, and a carrier sensing can be performed.

The communication device i can form a possible implementation of the communication device 200 as described in conjunction with FIG. 2. The neighboring devices 1 to 4 can form possible implementations of the neighboring devices 401, 403, 405 as described in conjunction with FIG. 4.

Figure 14:
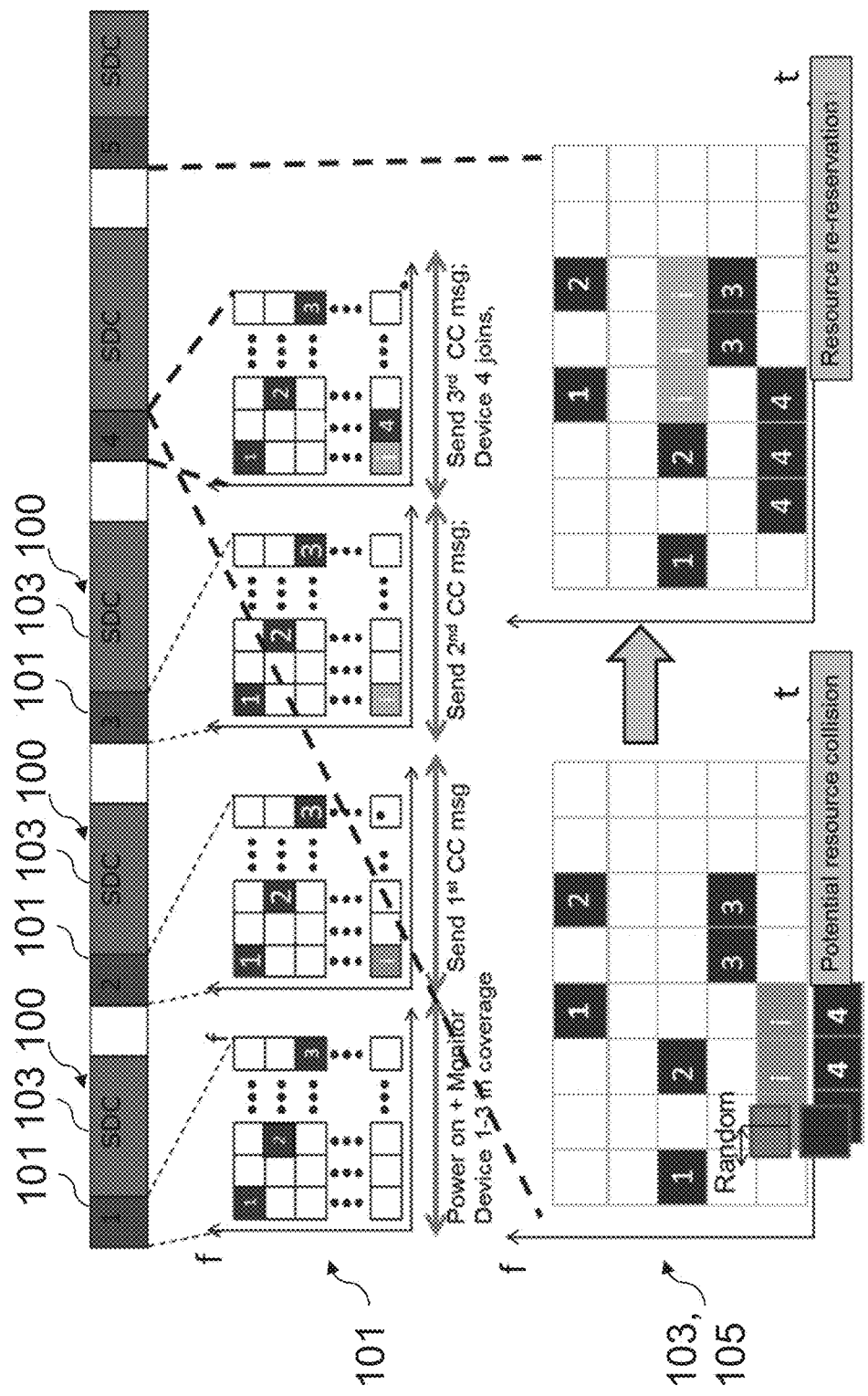
FIG. 14 shows a diagram of a protocol for communications between a communication device and neighboring devices in an ad-hoc mode according to an embodiment.

FIG. 14 shows a diagram of a protocol for communications between a communication device and neighboring devices in an ad-hoc mode according to an embodiment. The diagram shows a carrier sensing based re-reservation within the protocol. The protocol is based on the frame structure 100, where the frame structure 100 forms a possible implementation of the frame structure 100 as described in conjunction with FIG. 1.

The frame structure 100 communicates control data, high priority data, low priority data. It includes a control channel 101, a high priority data channel 103, and a low priority data channel 105. The control data is arranged within the control channel 101 at the first communication resource. The high priority data is arranged within the high priority data channel 103 at the second communication resource, and the low priority data is arranged within the low priority data channel 105 at the third communication resource.

In a first step, a power-on operation of the communication device i can be performed, and neighboring devices 1 to 3 in coverage can be monitored. In a second step, a first message within the CC 101 can be sent. In a third step, a second message within the CC 101 can be sent. In a fourth step, a third message within the CC 101 can be sent, where neighboring device 4 can join, where device 4 reserves the same SDC resource as device i. At the bottom left, a potential communication resource collision is illustrated, where device i selects a longer delay time (from a uniform random pick up within $1^{st}$ subframe) than device 4 and thus will eventually sense the resource to be busy and re-reserve another resource from the next sub frame. Device 4 selects a shorter delay time and thus will always sense the resource to be idle and obtain the resource reservation. At the bottom right, a communication resource re-reservation is illustrated.

The communication device i can form a possible implementation of the communication device 200 as described in conjunction with FIG. 2. The neighboring devices 1 to 4 can form possible implementations of the neighboring devices 401, 403, 405 as described in conjunction with FIG. 4.

Figure 15:
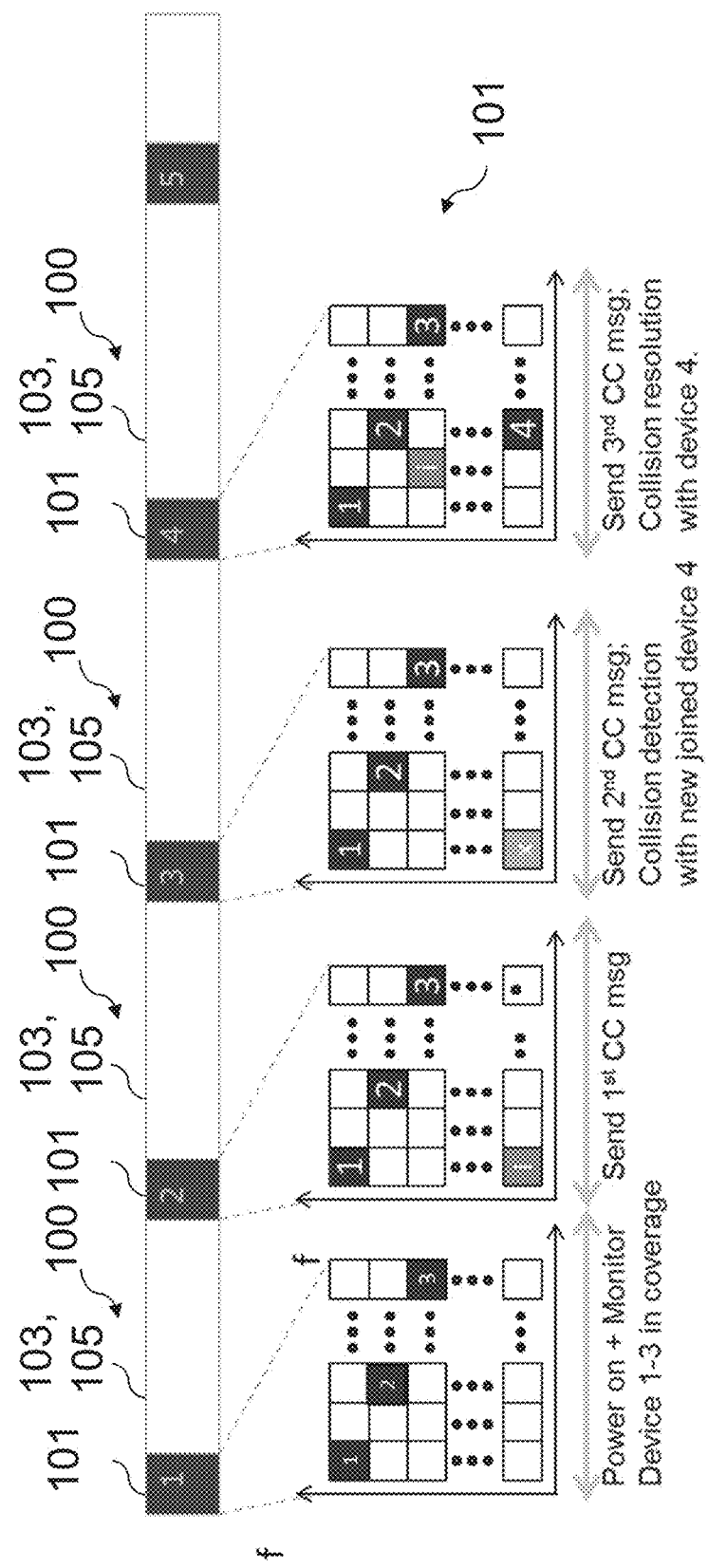
FIG. 15 shows a diagram of a protocol for communications between a communication device and neighboring devices in an ad-hoc mode according to an embodiment.

FIG. 15 shows a diagram of a protocol for communications between a communication device and neighboring devices in an ad-hoc mode according to an embodiment. The diagram illustrates the MAC protocol in the ad-hoc mode using a distributed CC communication resource access within the protocol. The protocol is based on the frame structure 100, where the frame structure 100 forms a possible implementation of the frame structure 100 as described in conjunction with FIG. 1.

The frame structure 100 communicates control data, high priority data, low priority data. It includes a control channel 101, a high priority data channel 103, and a low priority data channel 105. The control data is arranged within the control channel 101 at the first communication resource. The high priority data is arranged within the high priority data channel 103 at the second communication resource, and the low priority data is arranged within the low priority data channel 105 at the second communication resource.

A communication resource collision detection and resolution within the CC 101 can e.g. be performed as follows. When communication device i may not be able to detect collisions by itself, the neighboring devices can collaboratively help. Each device can include one-hop device information, e.g. communication device ID, and/or reserved communication resource ID, into the message within the CC 101.

The communication device i can detect the collision e.g. by decoding from neighboring device 2 and neighboring device 3 that both of them may not have communication device i and its reserved communication resource ID in their neighboring device list. Communication device i can then resolve the collision by randomly selecting another empty communication resource within the CC 101. Half-duplexing constraints can further be alleviated, where each device can re-select its communication resource within the CC 101 according to its specific timer.

The communication device i can form a possible implementation of the communication device 200 as described in conjunction with FIG. 2. The neighboring devices 2 to 3 can form possible implementations of the neighboring devices 401, 403 as described in conjunction with FIG. 4.

Figure 16:
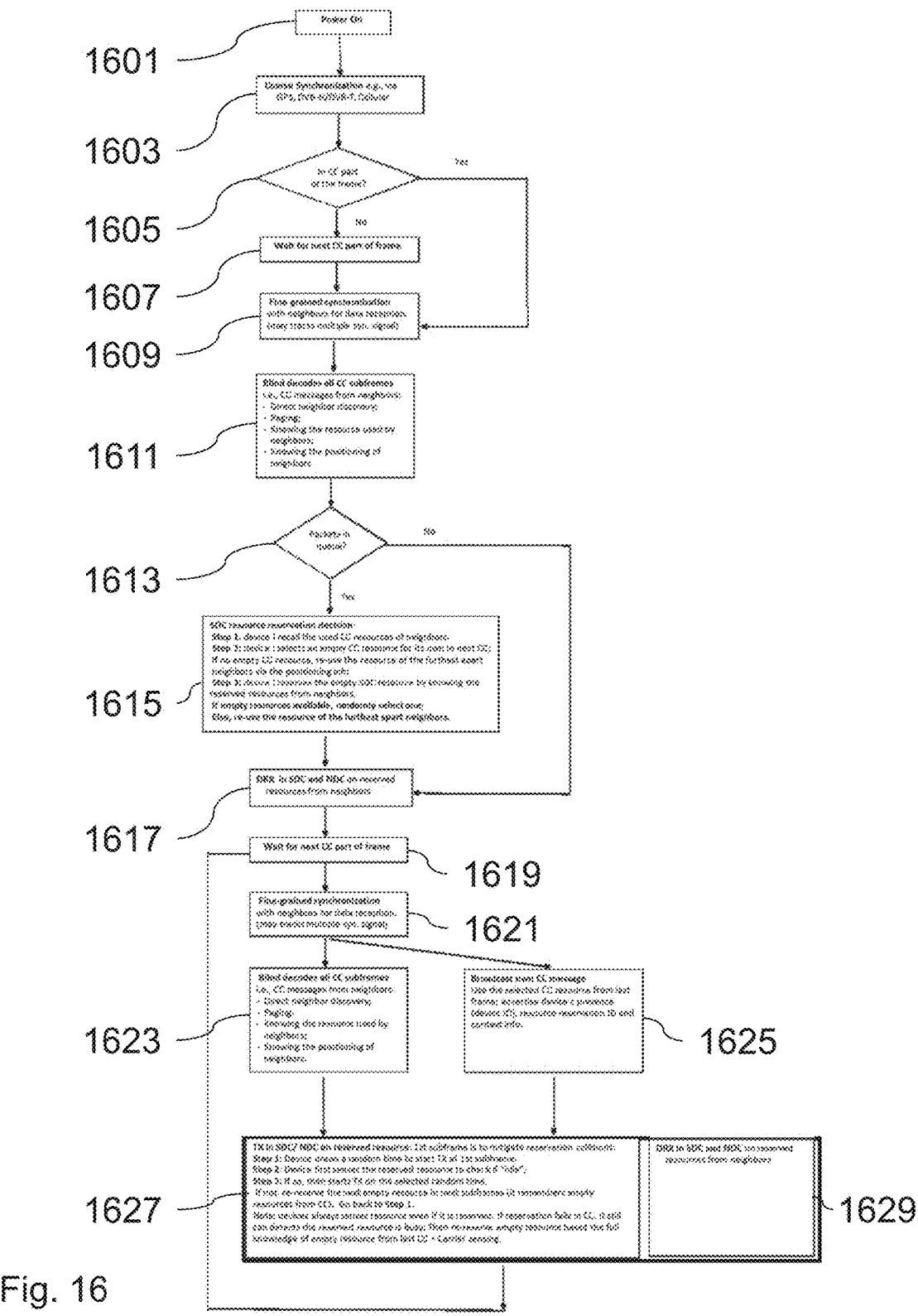
FIG. 16 shows a diagram of a protocol for communications between a communication device and neighboring devices in an ad-hoc mode according to an embodiment.

FIG. 16 shows a diagram of a protocol for communications between a communication device and neighboring devices in an ad-hoc mode according to an embodiment. The distributed MAC protocol for the ad-hoc mode is illustrated using a message sequence chart. The diagram includes a number of steps 1601-1629.

The protocol is based on the frame structure 100, where the frame structure 100 forms a possible implementation of the frame structure 100 as described in conjunction with FIG. 1. The communication device 200 as described in conjunction with FIG. 2 can be configured to operate according to the protocol.

In step 1601, the communication device 200 can be powered on. In step 1603, a coarse synchronization of the communication device 200 can be performed, e.g. based on global positioning system (GPS) communication signals, digital video broadcasting handhelds (DVB-H) communication signals, digital video broadcasting terrestrial (DVB-T) communication signals, and/or cellular communication signals.

In step 1605, the communication device 200 can determine whether it is synchronized on the CC 101 of the frame structure 100. If this is not the case, the communication device 200 can wait for a next CC 101 of the frame structure 100 in step 1607. If this is the case or succeeding to step 1607, the communication device 200 can perform a fine-grained synchronization with neighboring devices for data reception in step 1609. It may e.g. track multiple synchronization sequences or synchronization signals of the neighboring devices.

In step 1611, the communication device 200 can blindly decode sub-frames, e.g. all sub-frames, of the CC 101, i.e. messages within the CC 101 from the neighboring devices. Therefore, a direct neighboring device discovery, and a paging can be achieved. Furthermore, the communication device 200 can know and/or store the communication resources used by the neighboring devices and the geographic positions of the neighboring devices.

In step 1613, the communication device 200 can determine whether transmission high priority data and/or transmission low priority data, e.g. in form of data packets, are in a data queue.

If this is the case, the communication device 200 can perform a communication resource reservation decision for the high priority data channel 103, e.g. the SDC portion, in step 1615. Firstly, the communication device 200 can recall the used communication resources within the CC 101 of the neighboring devices. Secondly, the communication device 200 can select an empty communication resource within the CC 101 for its own in the next control CC 101. If no empty communication resource within the CC 101 is available, the communication device 200 can re-use the communication resource of the furthest apart neighboring device e.g. using the geographic position information. Thirdly, the communication device 200 can reserve an empty communication resource within the high priority data channel 103, e.g. the SDC portion, by knowing the reserved communication resources from the neighboring devices. If empty communication resources are available, the communication device 200 can randomly select one. Else, the communication device 200 can re-use the communication resource of the furthest apart neighboring device.

If this is not the case or succeeding to step 1615, a reception (DRX) of the high priority data and/or the low priority data arranged within the high priority data channel 103, e.g. the SDC portion, and/or the low priority data channel 105, e.g. the NDC portion, based on the reserved communication resources from the neighboring devices can be performed in step 1617.

In step 1619, the communication device 200 can wait for a next CC 101 of the frame structure 100. In step 1621, the communication device 200 can perform a fine-grained synchronization with neighboring devices for data reception. It may e.g. track multiple synchronization sequences or synchronization signals of the neighboring devices.

In step 1623, the communication device 200 can blindly decode sub-frames, e.g. all sub-frames, of the CC 101, i.e. messages within the CC 101 from the neighboring devices. Therefore, a direct neighboring device discovery, and a paging can be achieved. Furthermore, the communication device 200 can know and/or store the communication resources used by the neighboring devices and the geographic positions of the neighboring devices.

In step 1625, the communication device 200 can broadcast an own message within the CC 101. The communication device 200 can use the selected communication resource within the CC 101 from the last frame structure 100. The communication device 200 can advertise the communication device presence e.g. using a communication device ID, a communication resource reservation ID, and/or context information.

In step 1627, the communication device 200 can transmit (TX) within the high priority data channel 103, e.g. the SDC portion, and/or the low priority data channel 105, e.g. the NDC portion, on the reserved communication resources. In an embodiment, the transmission high priority data and/or the transmission low priority data is transmitted. The first sub-frame can be to mitigate reservation collisions. Firstly, the communication device 200 can draw a random transmission delay time to start a TX at the first sub-frame. Secondly, the communication device 200 can firstly sense the reserved communication resource to check whether it is idle. Thirdly, if this is the case, then the communication device 200 can start the TX on the selected random transmission delay time. If this is not the case, the communication device 200 can re-reserve the next empty communication resource in a next sub-frame. The communication device 200 can remember empty communication resources from the CC 101. The communication device 200 can then proceed with a first step, e.g. the step 1619.

The devices can sense a communication resource even if it is reserved. If the reservation fails in the CC 101, the devices can still detect that the reserved communication resource is busy. Then, the devices can re-reserve an empty communication resource based on the full knowledge of empty communication resources from the last CC 101 and/or a carrier sensing.

In step 1629, a reception (DRX) of the high priority data and/or the low priority data arranged within the high priority data channel 103, e.g. the SDC portion, and/or the low priority data channel 105, e.g. the NDC portion, based on the reserved communication resources from the neighboring devices can be performed.

Figure 17:
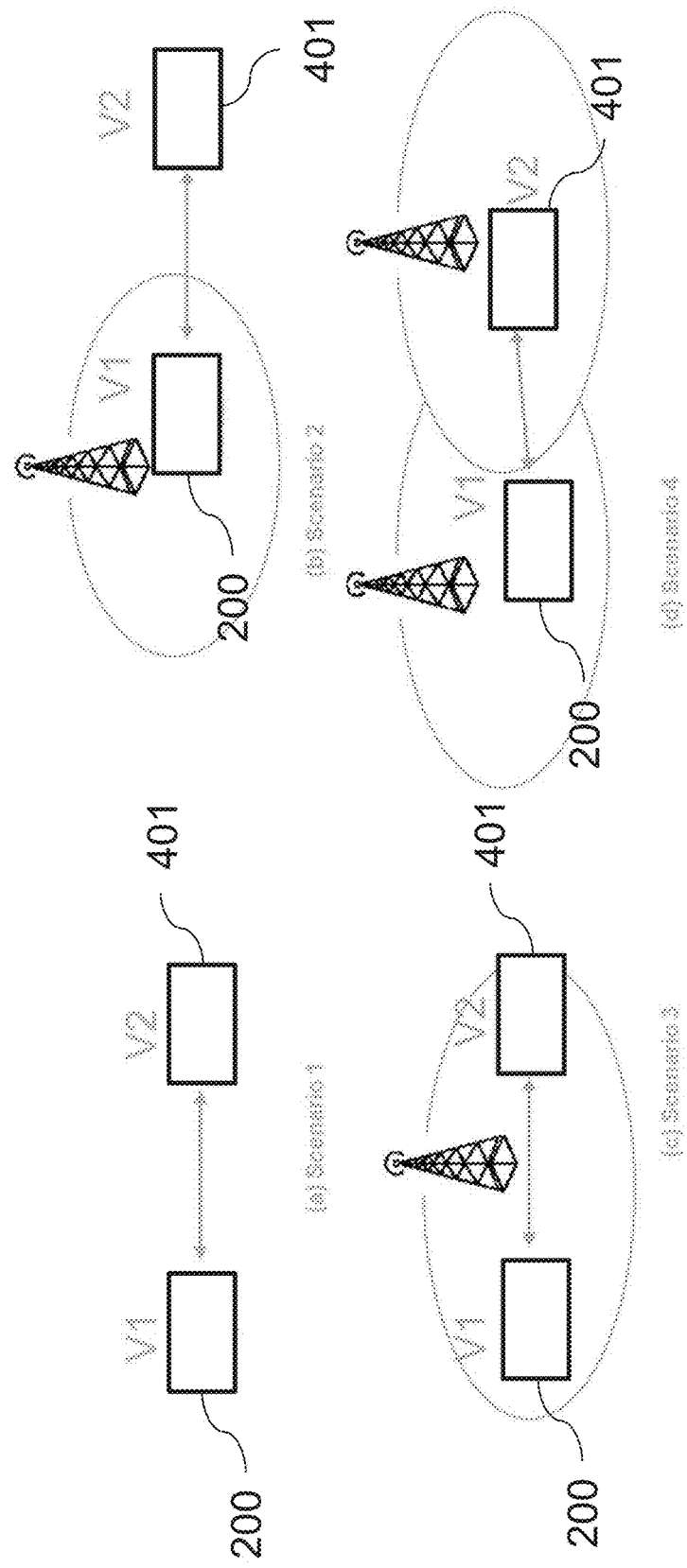
FIG. 17 shows a diagram of communication scenarios in an ad-hoc mode and a network-assisted mode according to an embodiment.

FIG. 17 shows a diagram of communication scenarios in an ad-hoc mode and a network-assisted mode according to an embodiment. The diagram shows a communication device 200 and a neighboring device 401. The communication device 200 forms a possible implementation of the communication device 200 as described in conjunction with FIG. 2. The neighboring device 401 forms a possible implementation of the neighboring device 401 as described in conjunction with FIG. 4.

The first scenario relates to an out-of-coverage scenario, where the communication device 200 (V1) is out-of-coverage, and the neighboring device 401 (V2) is out-of-coverage. The second scenario relates to a partial-coverage scenario, where the communication device 200 (V1) is in-coverage, and the neighboring device 401 (V2) is out-of-coverage. The third scenario relates to an in-coverage-single-cell scenario, where the communication device 200 (V1) is in-coverage, and the neighboring device 401 (V2) is in-coverage. The fourth scenario relates to an in-coverage-multi-cell scenario, where the communication device 200 (V1) is in-coverage, and the neighboring device 401 (V2) is in-coverage.

In an embodiment, the frame structure 100 can be structured in dependence of a mode, e.g. an ad-hoc mode and a network-assisted mode. The mode can be switched based on the coverage within the described scenarios.

FIG. 18 shows two prior art networks. The diagram shows a communication device 200 and a neighboring device 401. The communication device 200 forms a possible implementation of the communication device 200 as described in conjunction with FIG. 2. The neighboring device 401 forms a possible implementation of the neighboring device 401 as described in conjunction with FIG. 4.

On the left side of the diagram, a communication scenario in ad-hoc mode is shown. The communication device 200 and the neighboring device 401 can e.g. communicate based on IEEE 802.11p communication signals.

On the right side of the diagram, a communication scenario in network-assisted mode is shown. The communication device 200 and the neighboring device 401 can e.g. communicate based on third generation (3G) cellular communication signals or fourth generation (4G) cellular communication signals, e.g. LTE communication signals. In network-assisted mode, communications can be performed using a communication network node, e.g. an eNB, and/or a backend server.

Therefore, solutions for V2X services using IEEE 802.11p and/or cellular LTE can be provided.

Although the embodiments are described with reference to specific features, implementation forms, and embodiments, it is evident that various modifications and combinations can be made thereto without departing from the spirit and scope of the embodiments. The description and the figures are, accordingly, to be regarded simply as an illustration of the embodiments as defined by the appended claims, and are contemplated to cover any and all modifications, variations, combinations, or equivalents that fall within the scope of the embodiments.

What is claimed is:

1. A communication device comprising:
    a receiver configured to receive, from a neighboring device, a device-to-device network communication signal, wherein the device-to-device network communication signal comprises a frame structure in the device-to-device network communication signal, wherein the frame structure comprises:
        a high priority data channel comprising high priority data;
        a low priority data channel comprising low priority data; and
        a control channel comprising control data, wherein the control channel comprises:
            a high priority data channel control portion configured to communicate control data related to the high priority data channel; and
            a low priority data channel control portion configured to communicate control data related to the low priority data channel,
        wherein the control data is received in the control channel on a first communication resource,
        wherein the high priority data is received on the high priority data channel on a second communication resource, and
        wherein the low priority data is received in the low priority data channel on a third communication resource.

2. The communication device of claim 1, wherein the frame structure is structured in accordance with a mode of a set of modes, and wherein the set of modes comprises an ad-hoc mode and a network-assisted mode.

3. The communication device of claim 2, wherein the communication device is configured to use the frame structure to communicate data directly with the neighboring device.

4. The communication device of claim 2, wherein the communication device is configured to communicate a second frame structure comprising a second high priority data channel control portion or a second low priority data channel control portion, with a cellular network controller, and wherein the second frame structure is in the network-assisted mode.

5. The communication device of claim 1, wherein the high priority data channel control portion or the low priority data channel control portion of the control channel is configured to communicate a synchronization sequence.

6. The communication device of claim 1, wherein the frame structure has a predetermined dimension, the high priority data channel control portion of the control channel is allocated permanently, or the low priority data channel control portion of the control channel is allocated permanently.

7. The communication device of claim 1, wherein the first communication resource, the second communication resource, or the third communication resource comprises a time domain resource, a frequency domain resource, or a coding sequence.

8. The communication device of claim 1, wherein the second communication resource is multiplexed with the third communication resource.

9. The communication device of claim 1, wherein the communication device is configured to:
    extract the frame structure from the device-to-device network communication signal;
    extract the control channel from the frame structure;
    extract the high priority data channel control portion and the low priority data channel control portion from the control channel;
    extract the control data from the control channel in accordance with the first communication resource;
    extract the high priority data from the high priority data channel in accordance with the second communication resource; and
    extract the low priority data from the low priority data channel in accordance with the third communication resource.

10. The communication device of claim 1, wherein the receiver is further configured to receive a mode indicator signal, and wherein the communication device is configured to determine a mode of the frame structure in accordance with the mode indicator signal.

11. The communication device of claim 1, wherein the communication device is further configured to:
    determine a signal strength of a cellular network signal; and
    determine a mode of the frame structure in accordance with the signal strength of the device-to-device network communication signal.

12. The communication device of claim 1, wherein the communication device is configured to:
    operate according to a protocol comprising a first phase and a second phase;
    only receive data communicated in the control channel, the high priority data, or the low priority data, during the first phase of the protocol; and
    communicate data communicated in the control channel, the high priority data, and the low priority data, during the second phase of the protocol.

13. The communication device of claim 12, wherein the communication device is configured to communicate data associated with a plurality of neighboring devices, comprising communicating payload data, data on device identity, synchronization sequence data, resource reservation ID data, geographic positions, or communication device identifications of the plurality of neighboring devices.

14. A communication device comprising:
    a transmitter configured to send, to a neighboring device, a device-to-device network communication signal, wherein the device-to-device network communication signal comprises a frame structure in the device-to-device network communication signal, wherein the frame structure comprises:
        a high priority data channel comprising high priority data;
        a low priority data channel comprising low priority data; and
        a control channel, comprising control data, wherein the control channel comprises:
            a high priority data channel control portion configured to communicate control data related to the high priority data channel; and
            a low priority data channel control portion configured to communicate control data related to the low priority data channel,
    wherein the control data is sent in the control channel on a first communication resource,
    wherein the high priority data is sent on the high priority data channel on a second communication resource, and
    wherein the low priority data is sent in the low priority data channel on a third communication resource.

15. The communication device of claim 14, wherein the communication device is further configured to:
    configure the frame structure for the device-to-device network communication signal;
    generate the control data sent over the control channel;
    configure the high priority data channel control portion of the control channel or the low priority data channel control portion of the control channel;
    configure the high priority data channel of the device-to-device network communication signal or the low priority data channel of the device-to-device network communication signal;
    communicate the control data over the first communication resource;
    communicate the high priority data over the second communication resource; and
    communicate the low priority data over the third communication resource.

16. The communication device of claim 14, wherein the control channel, the high priority data channel, or the low priority data channel, comprises at least one sub-frame, and wherein the communication device is configured to sense, for a period of a random share for a length of the sub-frame, before sending data over the control channel, the high priority data channel, or the low priority data channel.

17. The communication device of claim 14, wherein the communication device is further configured to:
    determine whether a surrounding cellular network provides a priority to the device-to-device network communication signal; and
    use a long term evolution (LTE) network resource for sending the device-to-device network communication signal, in response to determining that the surrounding cellular network provides the priority to the device-to-device network communication signal.

18. The communication device of claim 14, wherein the communication device is further configured to communicate a predetermined data over at least two resources within the control channel, the high priority data channel, or the low priority data channel.

19. A method comprising:
    receiving, by a receiver of a communication device from a neighboring device, a device-to-device network communication signal, wherein the device-to-device network communication signal comprises a frame structure in the device-to-device network communication signal, wherein the frame structure comprises:
a high priority data channel comprising high priority data;
a low priority data channel comprising low priority data; and
a control channel, comprising control data, wherein the control channel comprises:
  a high priority data channel control portion configured to communicate control data related to the high priority data channel; and
  a low priority data channel control portion configured to communicate control data related to the low priority data channel,
wherein the control data is received in the control channel on a first communication resource,
wherein the high priority data is received on the high priority data channel on a second communication resource, and
wherein the low priority data is received in the low priority data channel on a third communication resource.

20. The method of claim 19, further comprising:
extracting the frame structure from the device-to-device network communication signal;
extracting the control channel from the frame structure;
extracting the high priority data channel control portion or the low priority data channel control portion from the control channel;
extracting the control data from the control channel in accordance with the first communication resource;
extracting the high priority data from the high priority data channel in accordance with the second communication resource; and
extracting the low priority data from the low priority data channel in accordance with the third communication resource.

* * * * *